US012163374B1

(12) United States Patent
Flannery et al.

(10) Patent No.: US 12,163,374 B1
(45) **Date of Patent: *Dec. 10, 2024**

(54) SOFT BARRIER

(71) Applicant: Regalo International, LLC, Burnsville, MN (US)

(72) Inventors: Mark A. Flannery, Longboat Key, FL (US); Michael P. Lane, Chaska, MN (US)

(73) Assignee: Regalo International, LLC, Longboat Key, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/197,098

(22) Filed: May 14, 2023

Related U.S. Application Data

(63) Continuation of application No. 17/525,920, filed on Nov. 14, 2021, now Pat. No. 11,649,669, which is a continuation of application No. 16/843,839, filed on Apr. 8, 2020, now Pat. No. 11,174,675.

(60) Provisional application No. 62/831,662, filed on Apr. 9, 2019.

(51) Int. Cl.

| | |
|---|---|
| ***E06B 9/06*** | (2006.01) |
| ***E05B 65/00*** | (2006.01) |
| ***E06B 11/02*** | (2006.01) |
| *E06B 9/00* | (2006.01) |

(52) U.S. Cl.
CPC ........ *E06B 9/0692* (2013.01); *E05B 65/0007* (2013.01); *E06B 9/063* (2013.01); *E06B 11/02* (2013.01); *E06B 2009/002* (2013.01)

(58) Field of Classification Search
CPC ..... E06B 9/00; E06B 9/02; E06B 9/04; E06B 9/06; E06B 9/0692; E06B 9/063; E06B 2009/002; E05B 65/0007
See application file for complete search history.

(56) References Cited

U.S. PATENT DOCUMENTS

| | | | |
|---|---|---|---|
| 2,531,310 | A | 11/1950 | Tonn |
| 3,163,205 | A | 12/1964 | Gottlieb |
| 4,572,109 | A | 2/1986 | Nixon |
| 4,628,635 | A | 12/1986 | Maillard |
| 5,483,779 | A | 1/1996 | Crawford |
| 5,531,258 | A | 7/1996 | Poulson |
| 5,575,113 | A | 11/1996 | Huang |
| 5,638,885 | A | 6/1997 | Freese |
| 5,657,809 | A | 8/1997 | Longoria |
| 5,704,164 | A | 1/1998 | Huang |
| 6,056,038 | A | 5/2000 | Foster |
| 6,296,041 | B1 | 10/2001 | Cicero |
| 6,427,396 | B1 | 8/2002 | Harrison |
| 6,474,021 | B2 | 11/2002 | Homeyer |
| 7,219,709 | B1 | 5/2007 | Williams |
| 7,422,048 | B2 | 9/2008 | Andersen |

(Continued)

*Primary Examiner* — Justin B Rephann

(57) ABSTRACT

The present soft barrier includes sheeting and a frame. The frame includes longitudinal and lateral support members. The sheeting is in a relaxed state when the lateral support members are in a retracted state. The sheeting is in a taut state when the lateral support members are in an extended fixed state. The sheeting may be in either the relaxed state or taut state when the longitudinal support members are in a retracted state or an extended state. A first adjustment mechanism for increasing or decreasing the longitudinal length of the barrier is a quick slide mechanism. A second adjustment mechanism for finely increasing or finely decreasing the longitudinal length of the barrier is a rotatable mechanism.

13 Claims, 30 Drawing Sheets

(56) References Cited

U.S. PATENT DOCUMENTS

| | | | |
|---|---|---|---|
| 7,523,589 | B1 | 4/2009 | Smith |
| 8,196,348 | B2 | 6/2012 | Flannery |
| 8,261,490 | B2 | 9/2012 | Flannery et al. |
| 8,561,349 | B2 | 10/2013 | Flannery et al. |
| 9,151,111 | B2 | 10/2015 | Flannery et al. |
| 9,382,740 | B2 | 7/2016 | Flannery |
| 9,540,867 | B2 | 1/2017 | Pilgrim |
| 9,802,440 | B2 | 10/2017 | Lu |
| 9,820,590 | B2 | 11/2017 | Karasiewski |
| 9,945,176 | B2 | 4/2018 | Flannery et al. |
| 9,963,932 | B2 | 5/2018 | Wang |
| 10,538,958 | B2 | 1/2020 | Losik |
| 10,550,634 | B1 | 2/2020 | Holland |
| 10,570,660 | B2 | 2/2020 | Flannery et al. |
| 10,683,699 | B2 | 6/2020 | Wang |
| 10,808,454 | B1 | 10/2020 | Weix |
| 2006/0180283 | A1 | 8/2006 | Andersen |
| 2006/0180284 | A1 | 8/2006 | Wiggens |
| 2007/0144691 | A1 | 6/2007 | Yates |
| 2008/0307708 | A1 | 12/2008 | Quan |
| 2009/0158665 | A1 | 6/2009 | Wu |
| 2009/0211716 | A1 | 8/2009 | Fitzpatrick |
| 2011/0088323 | A1 | 4/2011 | Lundh |
| 2012/0186755 | A1 | 7/2012 | Sessa |
| 2012/0211182 | A1 | 8/2012 | Pilgrim |
| 2014/0373448 | A1 | 12/2014 | Henderson |
| 2015/0330142 | A1 | 11/2015 | Pilgrim |
| 2017/0260802 | A1 | 9/2017 | Losik |
| 2018/0274288 | A1 | 9/2018 | Wang |
| 2019/0003250 | A1 | 1/2019 | Flannery |
| 2019/0032399 | A1 | 1/2019 | Fitzpatrick |

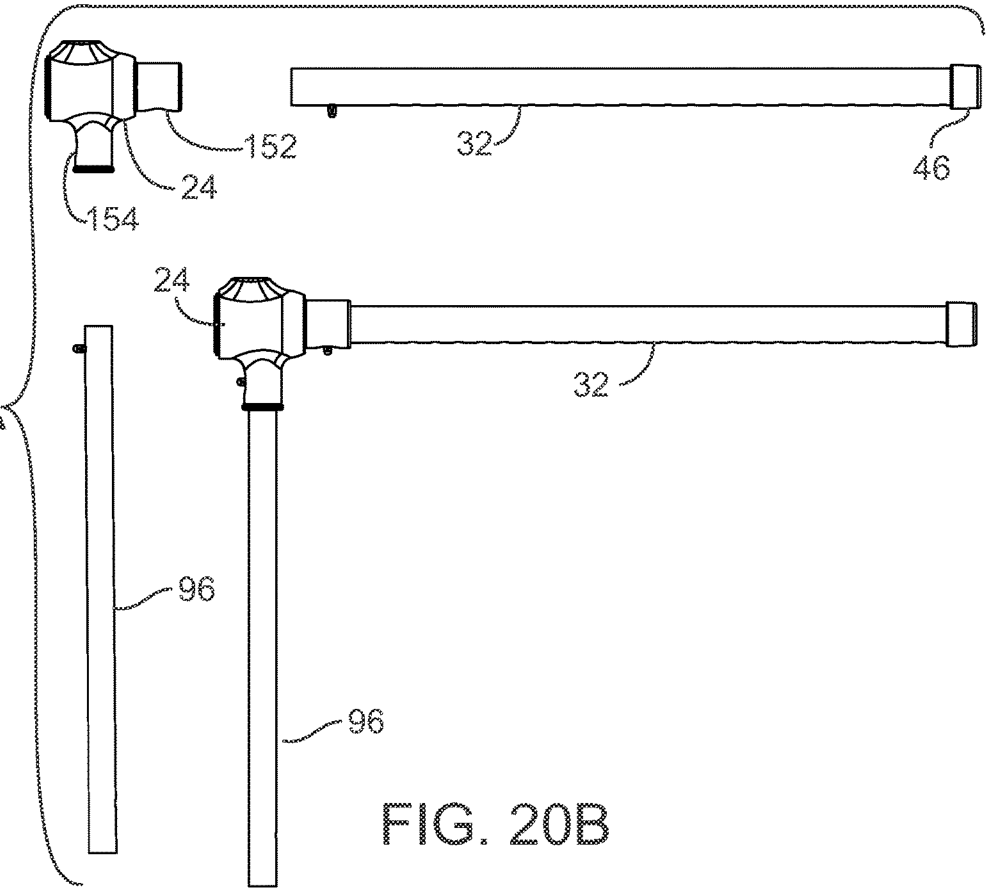
FIG. 20A
FIG. 20B
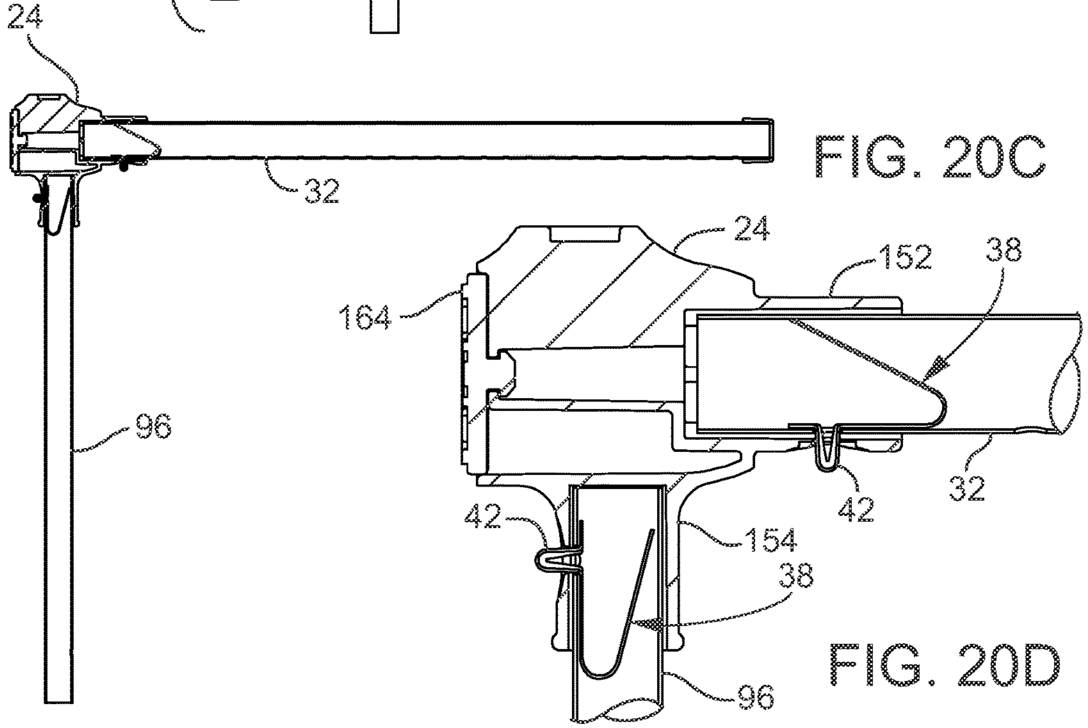
FIG. 20C
FIG. 20D

SOFT BARRIER

This application is a continuation of U.S. patent application Ser. No. 17/525,920 filed Nov. 14, 2021 (U.S. Pat. No. 11,649,669 issued May 16, 2023) and claims the benefit thereof under 35 U.S.C. § 120, which application is a continuation of U.S. patent application Ser. No. 16/843,839 filed Apr. 8, 2020 (U.S. Pat. No. 11,174,675 issued Nov. 16, 2021) and claims the benefit thereof under 35 U.S.C. § 120, which application claims the benefit under 35 U.S.C. 119 (e) of U.S. Provisional Patent Application No. 62/831,662 filed Apr. 9, 2019, which nonprovisional and provisional applications are hereby incorporated by reference in their entireties into this application.

FIELD OF THE INVENTION

The present invention relates to a barrier for a residential home, and more particularly to such a barrier that maximizes soft features and minimizes hard features.

BACKGROUND OF THE INVENTION

The first four definitions of "gate" in one dictionary are: 1. an opening in a wall or fence, 2. a city or castle entrance often with defensive structures (such as towers), 3.a. the frame or door that closes a gate, 3.b. a movable barrier (as at a grade crossing), 4.a. a means of entrance or exit, 4.b. a starting gate, 4.c. an area (as at a railroad station or an airport) for departure or arrival, and 4.d. a space between two markers through which a competitor must pass in the course of a slalom race.

A "gate" in the vernacular or common language of many people may mean a "door," a "fence," or a "fence with an opening," or something similar. Barriers that are used to keep pets out of certain areas of homes are often called "gates" whether or not the barrier has an "opening" or "door" or "gate."

Such barriers often include a plurality of vertical metal support members spaced apart and adjacent to one another and running from one end of the barrier to the other end of the barrier. Such barriers may include a plurality of horizontal metal support members spaced apart and adjacent from one another running from the top of the barrier to the bottom of the barrier.

SUMMARY OF THE INVENTION

A feature of the present invention is a soft barrier.

Another feature of the present invention is the provision in a soft barrier, of a frame having first and second longitudinal support members, first and second lateral support members, and first, second, third, and fourth junctions, where the first junction is between the first longitudinal support member and the first lateral support member, where the second junction is between the first lateral support member and the second longitudinal support member, where the third junction is between the second longitudinal support member and the second lateral support member, and where the fourth junction is between the second lateral support member and the first longitudinal support member.

Another feature of the present invention is the provision in a soft barrier, of flexible sheeting engaged between the first and second longitudinal support members and between the first and second lateral support member.

Another feature of the present invention is the provision in a soft barrier, of the flexible sheeting having a relaxed state and a taut state.

Another feature of the present invention is the provision in a soft barrier, of the first, second, third, and fourth junctions being engaged to the first and second longitudinal support members and the first and second lateral support members when the sheeting is in the relaxed state and when the sheeting is in the taut state.

Another feature of the present invention is the provision in a soft barrier, of the frame having a longitudinally fully extended state where a distance between the first and second lateral support members is maximized.

Another feature of the present invention is the provision in a soft barrier, of the frame having a longitudinally fully retracted state where the distance between the first and second lateral support members is minimized.

Another feature of the present invention is the provision in a soft barrier, of the frame being longitudinally extendable and longitudinally retractable to and from the longitudinally fully extended state and longitudinally fully retracted state when the sheeting is in each of the taut state and the relaxed state.

Another feature of the present invention is the provision in a soft barrier, of the frame having a laterally fully retracted state where the distance between the first and second longitudinal support members is minimized.

Another feature of the present invention is the provision in a soft barrier, of the frame having a laterally fixed extended state where a distance between the first and second lateral support members is fixed.

Another feature of the present invention is the provision in a soft barrier, of the frame being laterally extendable and laterally retractable to and from the laterally fully retracted state and laterally fixed state when the sheeting is in each of the taut state and the relaxed state.

Another feature of the present invention is the provision in a soft barrier, of a first adjustment mechanism.

Another feature of the present invention is the provision in a soft barrier, of a second adjustment mechanism.

Another feature of the present invention is the provision in a soft barrier, of each of the first and second longitudinal support members including first and second adjustment mechanisms.

Another feature of the present invention is the provision in a soft barrier, of the first adjustment mechanism fixing the lateral support members apart from each other at first and second predefined locations.

Another feature of the present invention is the provision in a soft barrier, of the second adjustment mechanism fixing the lateral support members apart from each other at a plurality of further locations, where the plurality of further locations are between the first and second predefined locations.

Another feature of the present invention is the provision in a soft barrier, of the first adjustment mechanism having a plurality of locations spaced longitudinally from each other with the longitudinal support members being lockable at each of said locations.

Another feature of the present invention is the provision in a soft barrier, of the second adjustment mechanism being operated after the first adjustment mechanism has been locked.

Another feature of the present invention is the provision in a soft barrier, of one second adjustment mechanism pushing on the third junction and another second adjustment mechanism pushing on the fourth junction so as to relatively push the lateral support members away from each other.

Another feature of the present invention is the provision in a soft barrier, of first and second longitudinal adjustment mechanisms increasing and decreasing a distance between the lateral support members.

Another feature of the present invention is the provision in a soft barrier, of one first longitudinal adjustment mechanism being disposed on each of the first and second longitudinal support member, where such first longitudinal adjustment mechanism includes longitudinal support member sections that are slideable and lockable with each other.

Another feature of the present invention is the provision in a soft barrier, of one second longitudinal adjustment mechanism being disposed on each of the first and second longitudinal support member, where such second longitudinal adjustment mechanism includes a rotatable hand wheel that pushes on one of the third and fourth junctions to push the lateral support members relatively away from each other.

Another feature of the present invention is the provision in a soft barrier, of the sheeting being in the relaxed state when the frame is in the laterally fully retracted state, and of the sheeting being in the taut state when the frame is in the laterally fixed state.

Another feature of the present invention is the provision in a soft barrier, of each of the first and second lateral support members including a first support member portion and a second support member portion.

Another feature of the present invention is the provision in a soft barrier, of the first support member portion including first and second ends, a stop intermediate such first and second ends, and a depressible button lock between the stop and the first end, where the first support member portion includes a male end section extending from the stop to the first end.

Another feature of the present invention is the provision in a soft barrier, of the second support member portion slidingly engaging the first support member portion and including a first end that engages the stop of the first support member portion and an opening that engages the depressible button lock, where the second support member portion includes a female end section that receives the male end section.

Another feature of the present invention is the provision in a soft barrier, of the first and second support member portions including a first length when the depressible button engages the opening.

Another feature of the present invention is the provision in a soft barrier, of the first and second support member portions including a second length when the first end of the second support member portion abuts the stop, where the first length is greater than the second length.

Another feature of the present invention is the provision in a soft barrier, of the sheeting being in the taut state when the first and second support members are disposed at the first length.

Another feature of the present invention is the provision in a soft barrier, of the sheeting being in the relaxed state when the first and second support members are disposed at the second length.

Another feature of the present invention is the provision in a soft barrier, of each of the lateral support members including first and second support members and of the first and second support members telescoping with each other and lockable to each other by a depressible button on one of the first and second support members engaging an opening in the other of the first and second support members when the first and second support members are disposed at a first position relative to each other.

Another feature of the present invention is the provision in a soft barrier, of one of the first and second support members including an end that engages a stop of the other of the first and second support members when the first and second support members are disposed at a second position relative to each other.

Another feature of the present invention is the provision in a soft barrier, of a length of the first and second support members being greater at the first position than at the second position.

Another feature of the present invention is the provision in a soft barrier, of the depressible button pressing outwardly against an inside of one of the first and second support members when said end engages said stop.

Another feature of the present invention is the provision in a soft barrier, of the depressible button snapping outwardly into the opening when the first and second support members are drawn apart from each other.

Another feature of the present invention is the provision in a soft barrier, of the sheeting being in the relaxed state when the first and second support members are in the second position, and of the sheeting being in the taut state when the first and second support members are in the first position.

Another feature of the present invention is the provision in a soft barrier, of the third junction slidingly engaging an end of the second longitudinal member, and of the second longitudinal member including a hand wheel that rotatably engages the second longitudinal member, where the hand wheel includes an end that engages and pushes the third junction relatively away from the second junction when the hand wheel is rotated.

Another feature of the present invention is the provision in a soft barrier, of the fourth junction slidingly engaging an end of the first longitudinal member, and of the first longitudinal member including a hand wheel that rotatably engages the first longitudinal member, where the hand wheel includes an end that engages and pushes the fourth junction relatively away from the first junction when the hand wheel is rotated.

Another feature of the present invention is the provision in a soft barrier, of the first and second lateral support members being relatively pushed apart from each other when the hand wheels are operated.

Another feature of the present invention is the provision in a soft barrier, of the first longitudinal support member including first, second, and third support member portions.

Another feature of the present invention is the provision in a soft barrier, of the first support member portion being engaged to the first junction, of the third support member portion being engaged to the fourth junction, and of the second support member portion being engaged to and between the first and third support member portions.

Another feature of the present invention is the provision in a soft barrier, of the first support member portion having a plurality of first openings, and of the second support member portion having a depressible button lock engagable with each of the first openings of the first support member portion.

Another feature of the present invention is the provision in a soft barrier, of the second support member portion having a plurality of second openings, and of the third support member portion having a depressible button lock engagable with each of the second openings of the second support member portion.

Another feature of the present invention is the provision in a soft barrier, of the third support member portion being slidable into the second support member portion, and of the second support member portion being slidable into the first support member portion.

Another feature of the present invention is the provision in a soft barrier, of the first support member portion being engagable to the second support member at a plurality of predefined spaced apart locations, and of the second support member being engagable to the third support member at a plurality of predefined spaced apart locations.

Another feature of the present invention is the provision in a soft barrier, of each of the first, second, and third support member portions having respective first, second, and third stops, of the third support member portion being slidable into the second support member portion until the third and second stops engage each other, and of the second support member portion being slidable into the first support member portion until the second and third stops engage each other.

Another feature of the present invention is the provision in a soft barrier, of the sheeting bypassing each of the first, second, third, and fourth junctions to permit access to each of the first, second, third, and fourth junctions.

Another feature of the present invention is the provision in a soft barrier, of the sheeting including first and second lateral sleeves for engaging the first and second lateral support members respectively, and of the sheeting including first and second longitudinal sleeves for engaging the first and second longitudinal support members respectively.

Another feature of the present invention is the provision in a soft barrier, of the first junction being disengagable from the first lateral support member and the fourth junction being disengagable from the second lateral support member with the first longitudinal member remaining engaged between the first and fourth junctions, where the first longitudinal member and first and fourth junctions are a first unit.

Another feature of the present invention is the provision in a soft barrier, of the second junction being disengagable from the first lateral support member and the third junction being disengagable from the second lateral support member with the second longitudinal member remaining engaged between the second and third junctions, where the second longitudinal member and second and third junctions are a second unit.

Another feature of the present invention is the provision in a soft barrier, of each of the first and second lateral support members including a retracted state and an extended state.

Another feature of the present invention is the provision in a soft barrier, of the first lateral support member being a third unit.

Another feature of the present invention is the provision in a soft barrier, of the second lateral support member being a fourth unit.

Another feature of the present invention is the provision in a soft barrier, of the first, second, third, and fourth units being engagable with the sheeting when i) the sheeting is in the relaxed state, ii) without the first, second, third, and fourth units being engaged to any of the other first, second, third, and fourth units, and iii) when the first and second lateral support members are in the retracted state.

Another feature of the present invention is the provision in a soft barrier, of the first, second, third, and fourth units being engagable with the sheeting when the sheeting is in the relaxed state i) while each of the first, second, third, and fourth units is engaged to two adjacent units to form said frame, ii) when the first and second lateral support members are in the retracted state, iii) such that the first and second lateral support members are extendable from the retracted state to the extended state to stretch the sheeting to the taut state from the relaxed state.

Another feature of the present invention is the provision in a soft barrier, of the soft barrier including no gate.

Another feature of the present invention is the provision in a soft barrier, of the sheeting including no gate.

Another feature of the present invention is the provision in a soft barrier, of the frame including no gate.

Another feature of the present invention is the provision in a soft barrier, of none of the longitudinal support members, lateral support members, first, second, third, and fourth junctions being engaged to a gate.

Another feature of the present invention is the provision in a soft barrier, of the soft barrier defining a plane.

Another feature of the present invention is the provision in a soft barrier, of the longitudinal support members opposing each other with no support members being engaged to and between the longitudinal support members.

Another feature of the present invention is the provision in a soft barrier, of the lateral support members opposing each other with no support members being engaged to and between the lateral support members.

An advantage of the present invention is that the present soft barrier in a retracted form may be stored in a relatively small space.

Another advantage of the present invention is that the present soft barrier in an extended form may traverse a relatively large space to close off such space.

Another advantage of the present invention is that the present soft barrier is forgiving. For example, a knee accidentally knocked against sheeting of the barrier may incur no shock.

Another advantage of the present invention is that the present soft barrier can be retracted and extended both laterally and longitudinally.

Another advantage of the present invention is that the present soft barrier can be quickly retracted and quickly extended.

Another advantage of the present invention is that the present soft barrier can be extended and retracted with a first broad adjustment and then can be extended and retracted with a second fine adjustment.

Another advantage of the present invention is that the present soft barrier can be first adjusted longitudinally to predefined locations, and then subsequently can be adjusted longitudinally and incrementally to an almost infinite number of locations between any two such predefined locations.

Another advantage of the present invention is that the present soft barrier minimizes hardware such as metal tubing so as to minimize cost.

Another advantage of the present invention is that the present soft barrier maximizes the use of soft materials such as fabric material and thus minimizes cost.

BRIEF DESCRIPTION OF THE DRAWINGS

FIG. 20A is an elevation disassembled view of the upper left corner junction, the upper lateral support member, and a longitudinal support member of the frame of FIG. 1.

FIG. 20B is an elevation assembled view of a left corner junction, upper lateral support member, and longitudinal support member of FIG. 18A.

FIG. 20C is a section view of the upper left corner junction, upper lateral support member, and longitudinal support member of FIG. 20B.

FIG. 20D is a detail section view of the upper left corner junction, upper lateral support member, and longitudinal support member of FIG. 20B.

DESCRIPTION

Figure 1:
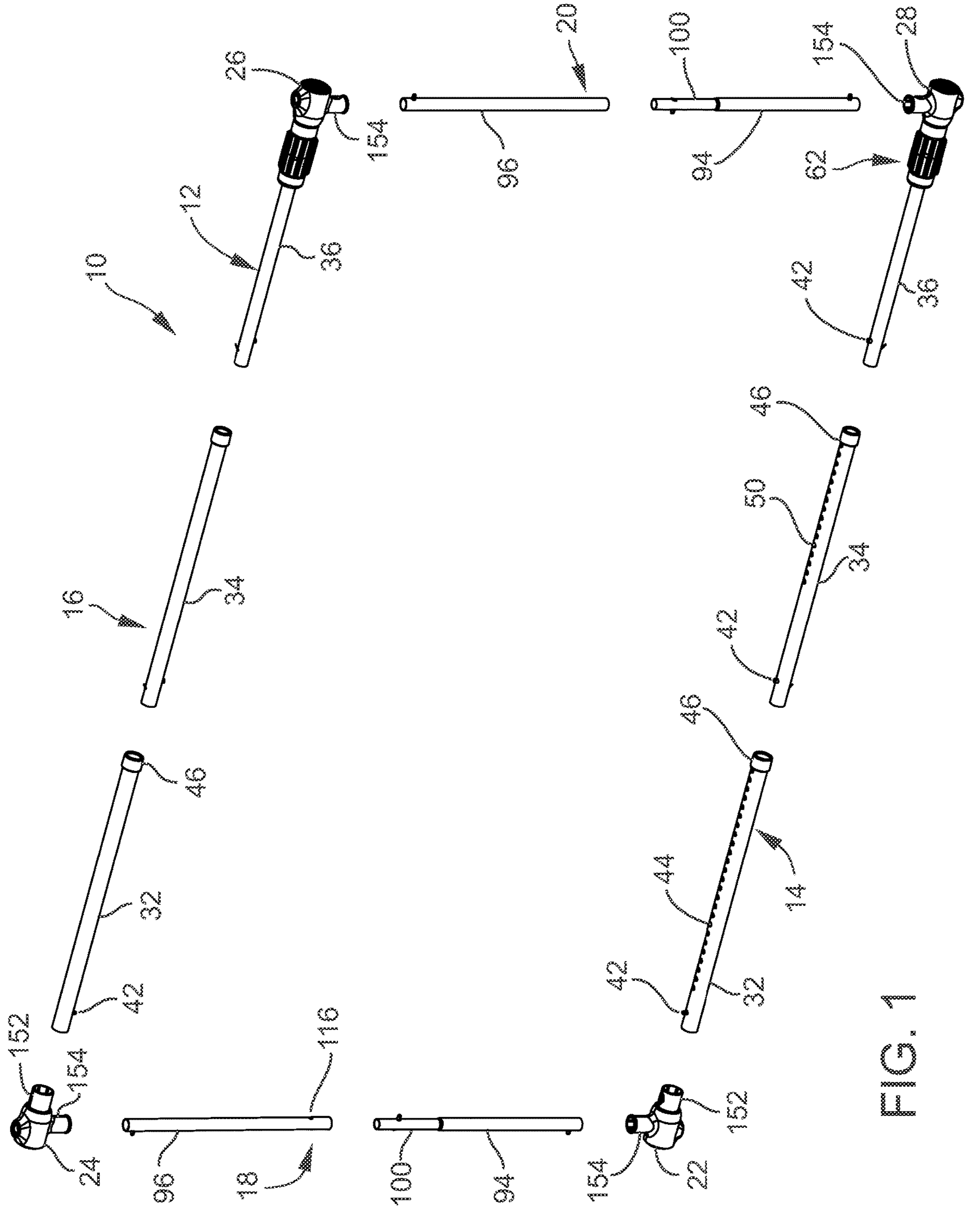
FIG. 1 is a perspective exploded view of the frame of the present soft gate.
Figure 4:
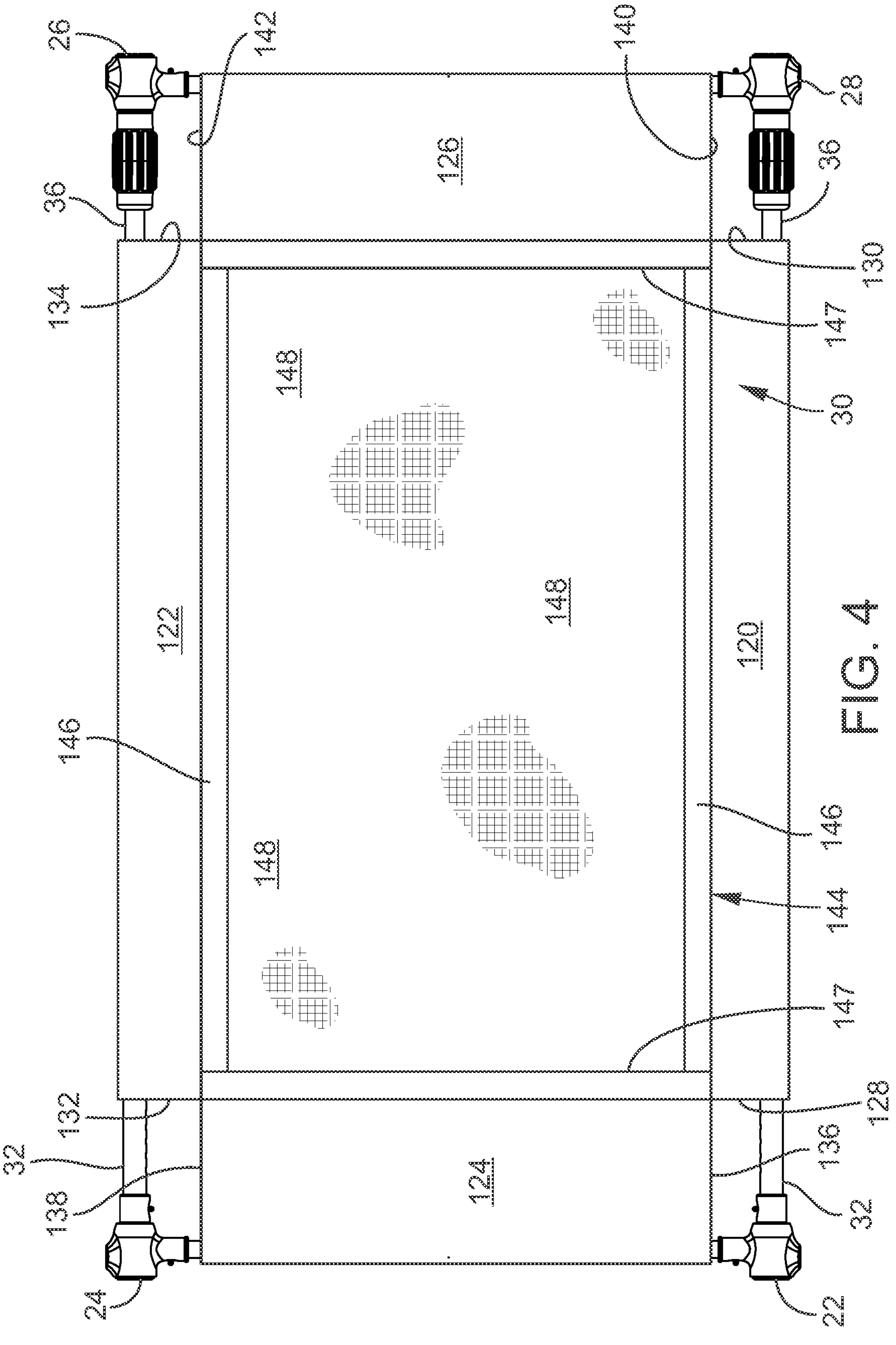
FIG. 4 is an elevation view of the present soft gate having the frame of FIG. 1 and further having sheeting engaged to the frame in a taut state such that the frame and sheeting make up a barrier.
Figure 5B:
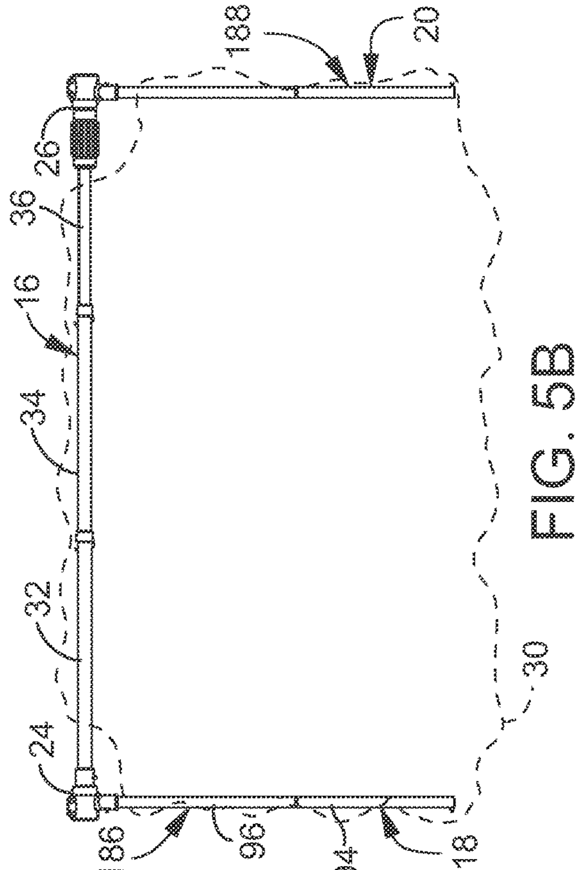
FIG. 5B is a view of the sheeting of FIG. 5A in phantom and in a relaxed state, with first, second, and third units engaged to the sheeting and to each other, where the second and third units are lateral support members of the frame of FIG. 1.
Figure 5A:
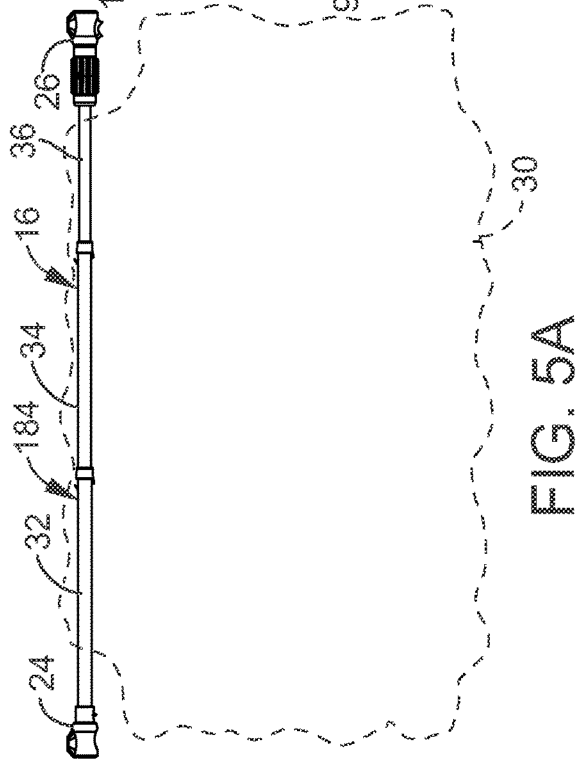
FIG. 5A is a view of the sheeting of FIG. 4 in phantom and in a relaxed state, with a first unit engaged to the sheeting, where the first unit is a pair of junctions and a longitudinal support member of the frame of FIG. 1.
Figure 5D:
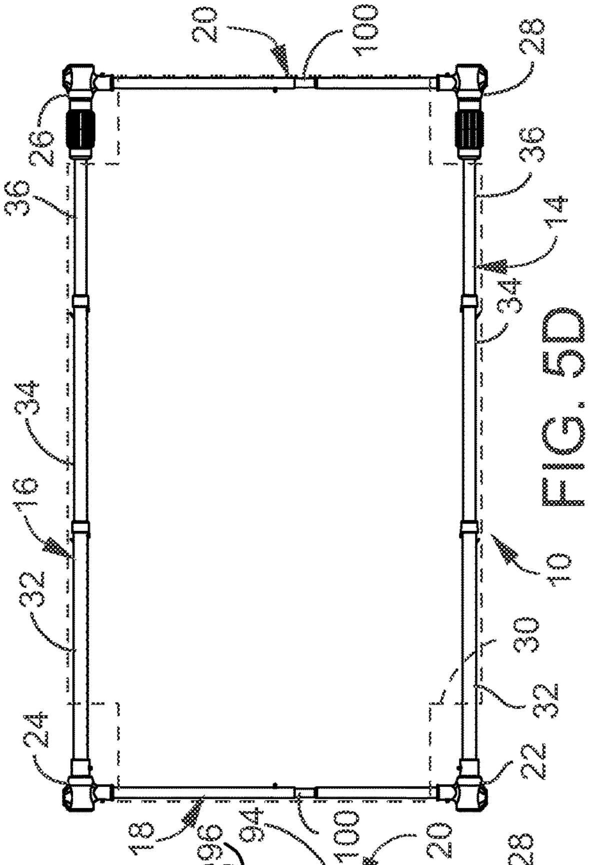
FIG. 5D is a view of the sheeting of FIG. 4 in a phantom state and in a taut state, where the lateral support members have been extended relative to FIGS. 5A, 5B, and 5C.
Figure 5C:
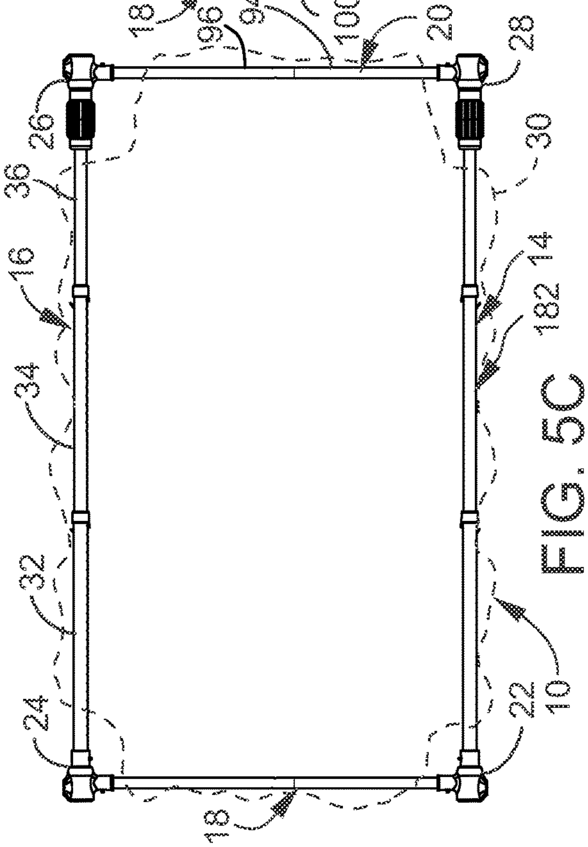
FIG. 5C is a view of the sheeting of FIG. 5A in phantom and in a relaxed state, with first, second, third, and fourth units engaged to the sheeting and to each other, where the fourth unit is a pair of junctions and a longitudinal support member of the frame of FIG. 1.
Figure 6:
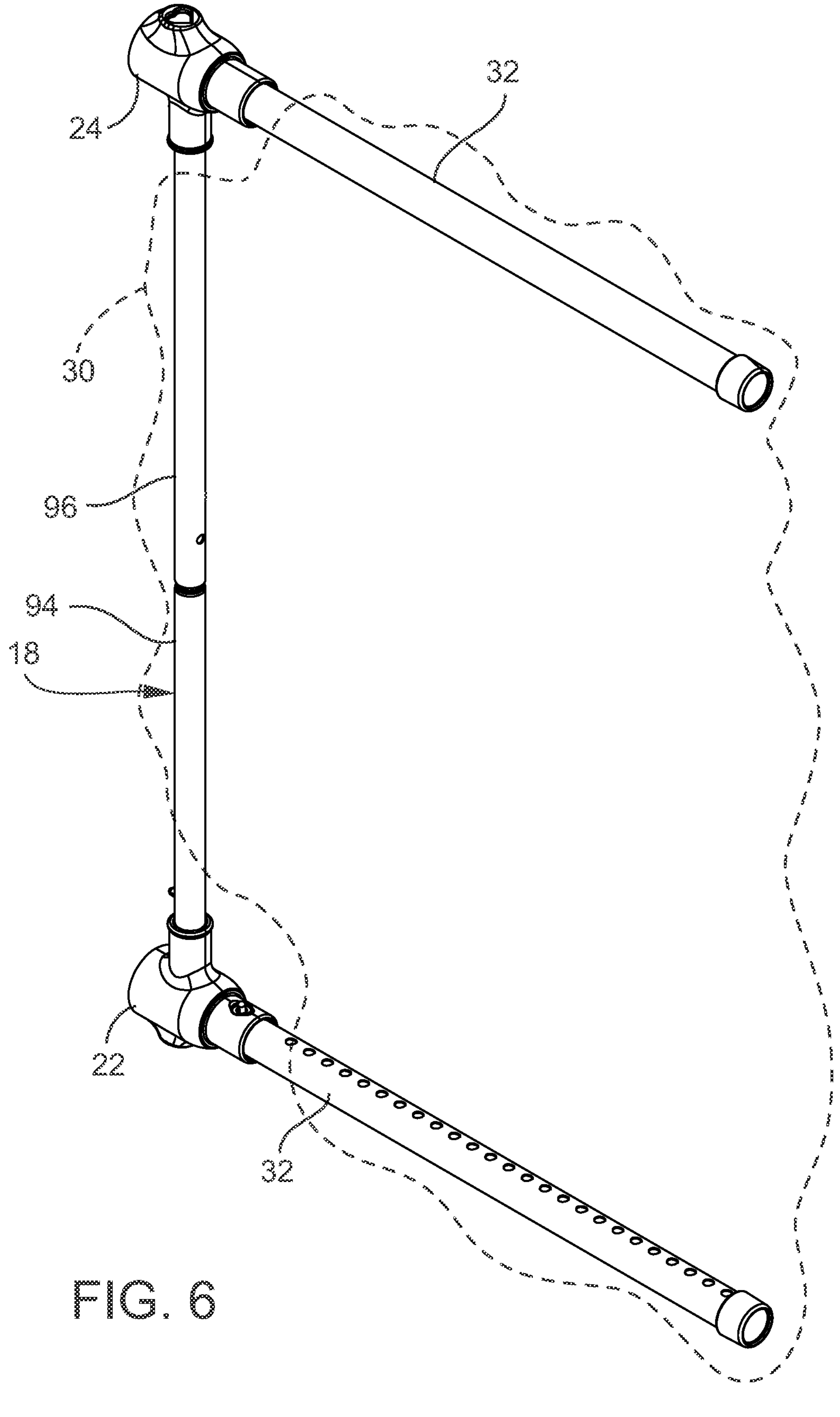
FIG. 6 is a detail view of a portion of FIG. 5B, showing the sheeting in a relaxed state and the frame laterally retracted.
Figure 7:
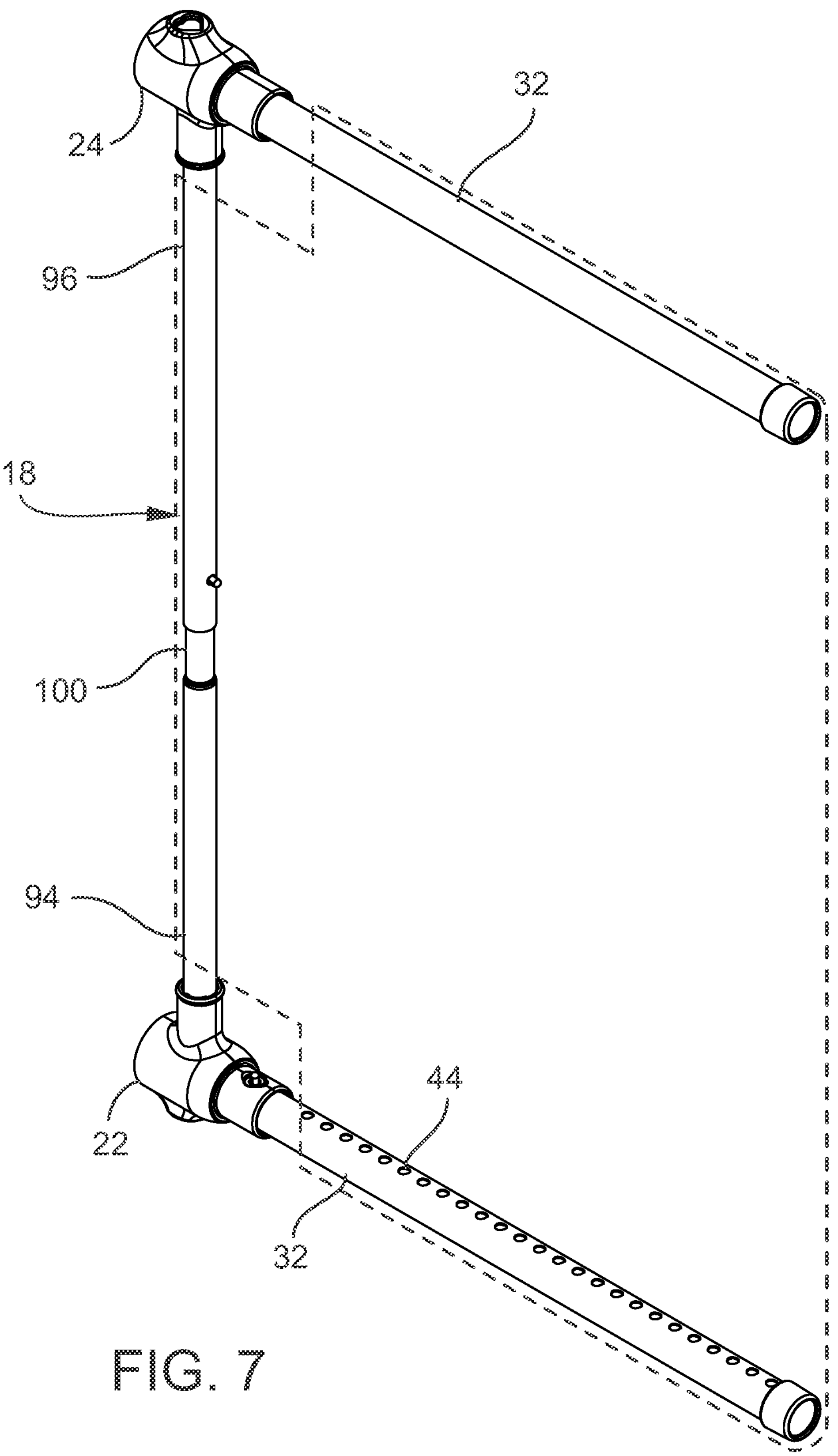
FIG. 7 is a detail view of a portion of FIG. 5D, showing the sheeting in a taut state and the frame laterally extended.
Figure 8A:
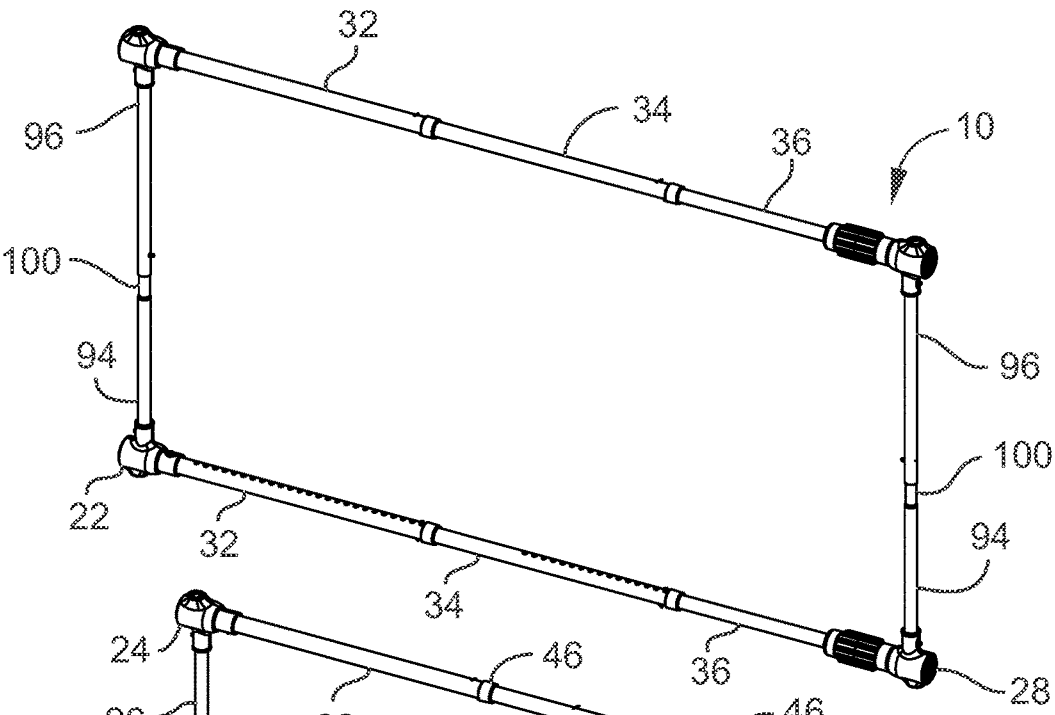
FIG. 8A is a perspective view of the frame of FIG. 1 having been extended longitudinally to a maximum extent and laterally to a fixed location.
Figure 8B:
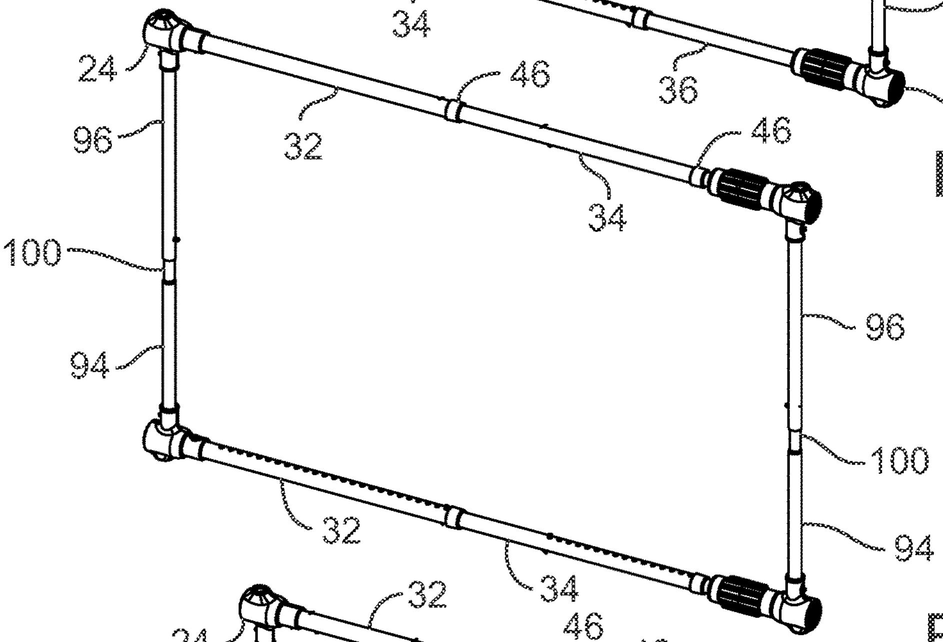
FIG. 8B is a perspective view of the frame of FIG. 8A having been retracted longitudinally relative to FIG. 8A to an intermediate state but maintaining the fixed location laterally of FIG. 8A.
Figure 8C:
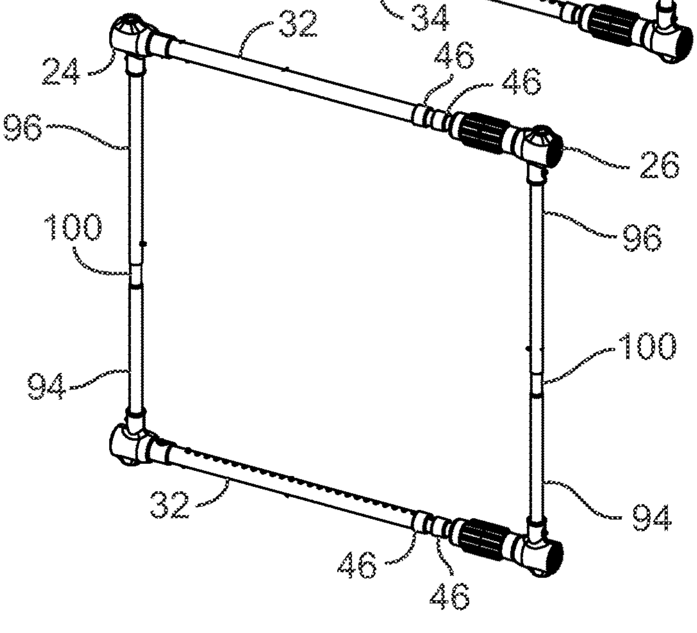
FIG. 8C is a perspective view of the frame of FIG. 8B having been retracted fully longitudinally to a maximum extent but maintaining the fixed location laterally of FIG. 8A.

As shown in FIG. 1, the present soft barrier is indicated by the reference number 10. Soft barrier 10 includes a frame 12 having a first longitudinal support member 14, a second longitudinal support member 16, a first lateral support member 18, and a second lateral support member 20. The frame 12 further includes a first junction 22 engaged between the first longitudinal support member 14 and the first lateral support member 18, a second junction 24 engaged between the first lateral support member 18 and the second longitudinal support member 16, a third junction 26 engaged between the second longitudinal support member 16 and the second lateral support member 20, and a fourth junction 28 engaged between the second lateral support member 20 and the first longitudinal support member 14. As shown in FIG. 4, the soft barrier 10 further includes sheeting 30 engaged to and between the first and second longitudinal support members 14, 16 and to and between the first and second lateral support members 18, 20.

Figure 18A:
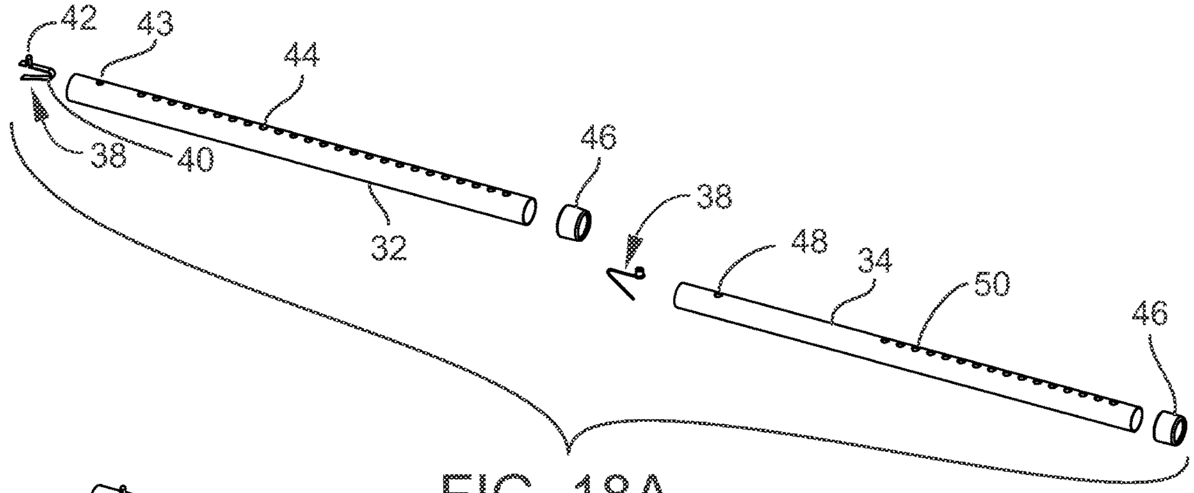
FIG. 18A is a perspective isolated disassembled view of the two apertured longitudinal support members of one of the longitudinal sides of the frame of FIG. 1.
Figure 18B:
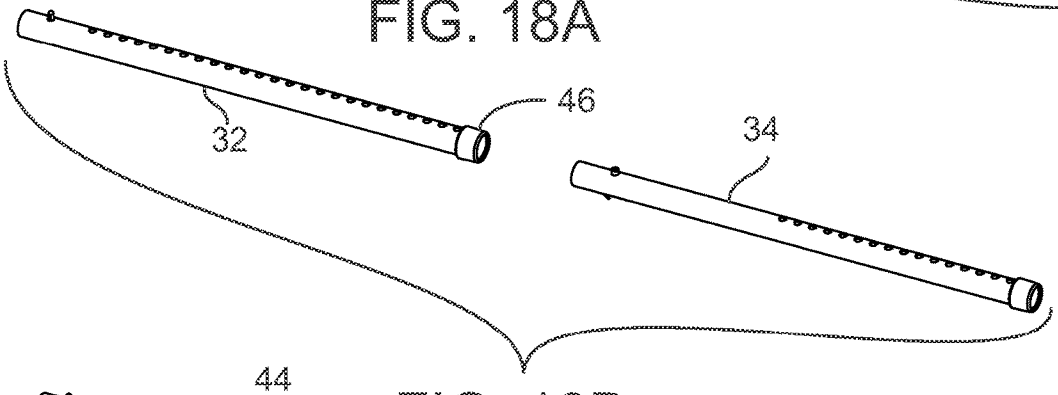
FIG. 18B is a perspective isolated assembled view of the two apertured longitudinal support members of FIG. 18A.
Figure 18C:
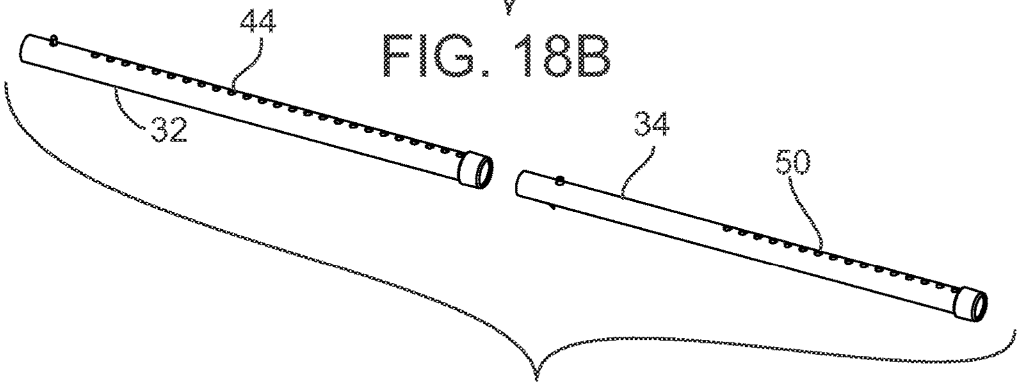
FIG. 18C is a perspective isolated assembled view of the two apertured longitudinal support members of FIG. 18B about to be engaged with one another.
Figure 18D:
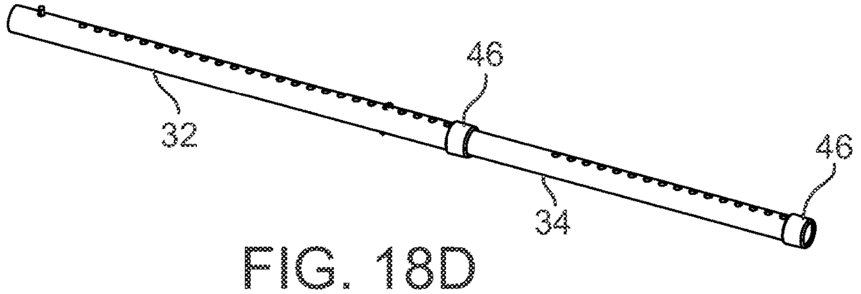
FIG. 18D is a perspective isolated assembled view of the two aperture longitudinal support members of FIG. 18C engaged to each other.
Figure 19A:
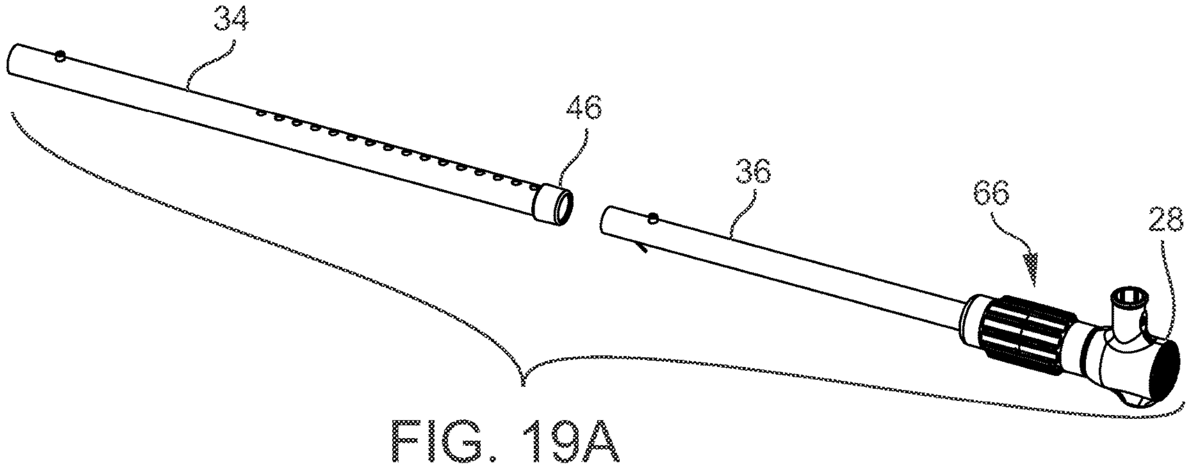
FIG. 19A is a perspective isolated disassembled view of longitudinal and corner portions of the frame of FIG. 1.
Figure 19B:
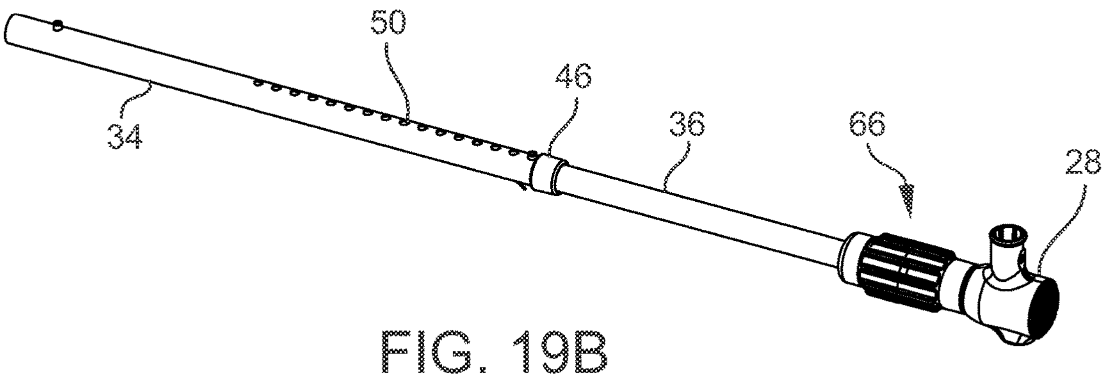
FIG. 19B is a perspective isolated assembled view of the longitudinal and corner portions of FIG. 19A.
Figure 21A:
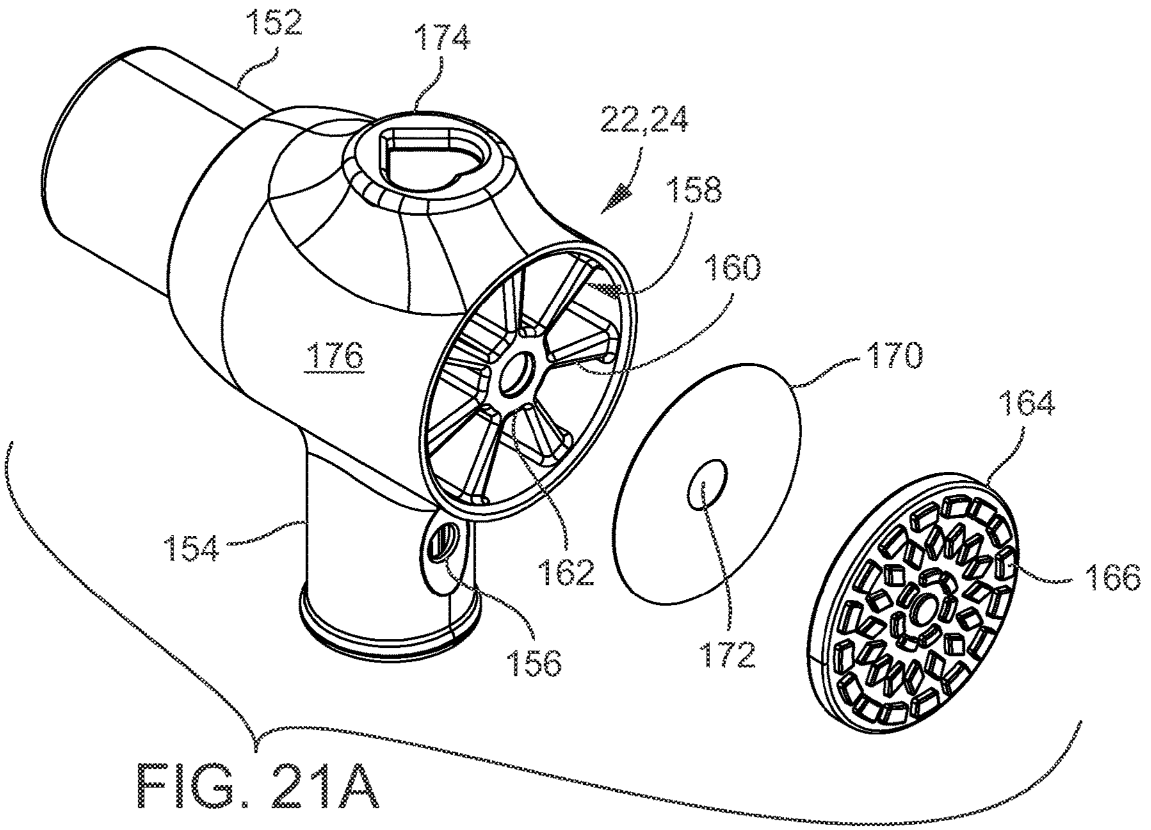
FIG. 21A is a perspective exploded disassembled view of one of the left junctions of the frame of FIG. 1.
Figure 21B:
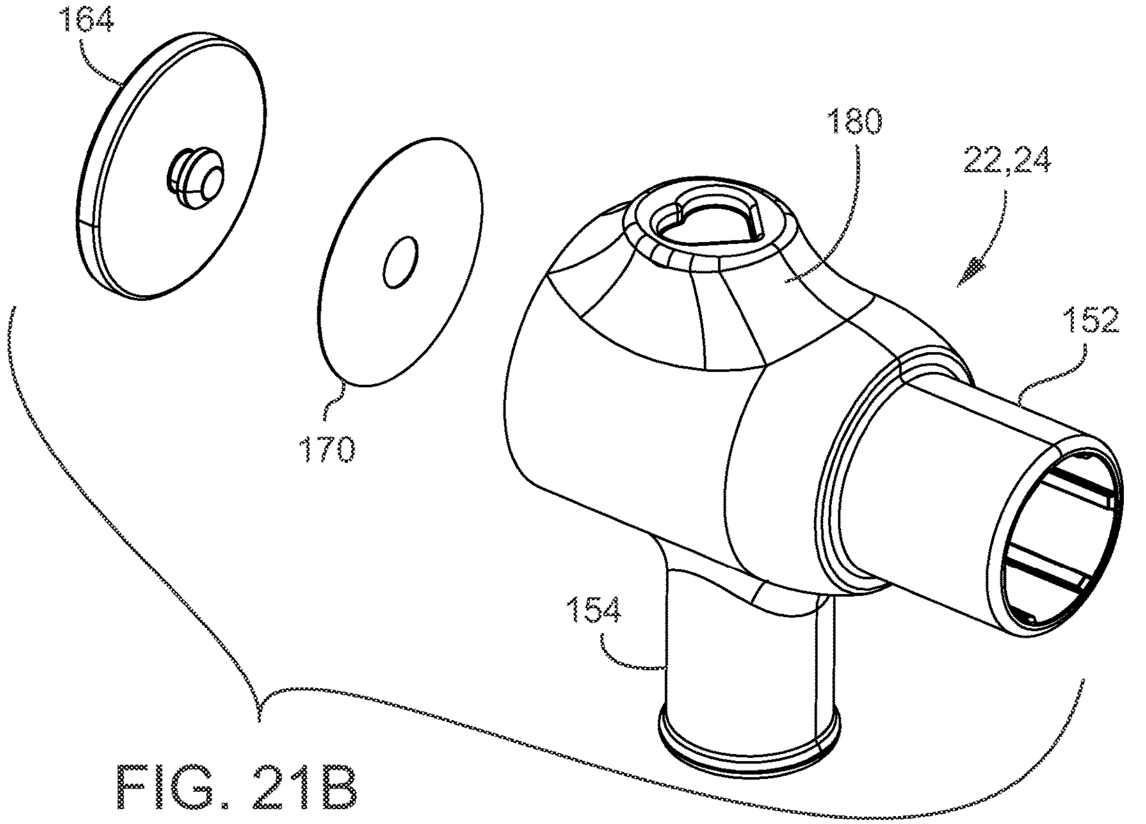
FIG. 21B is a perspective exploded disassembled view of the left junction of FIG. 21B taken from a perspective different from FIG. 21A.
Figure 22A:
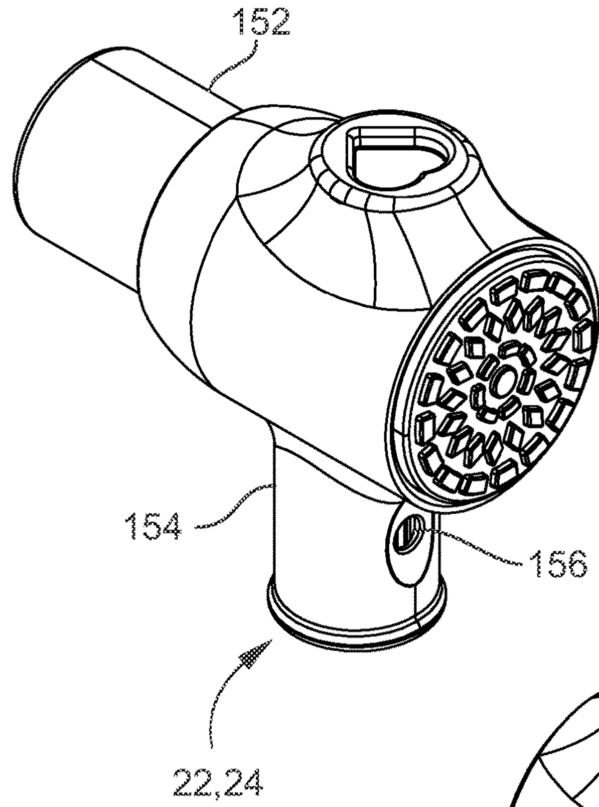
FIG. 22A is a perspective assembled view of one of the left junctions of the frame of FIG. 1.
Figure 22B:
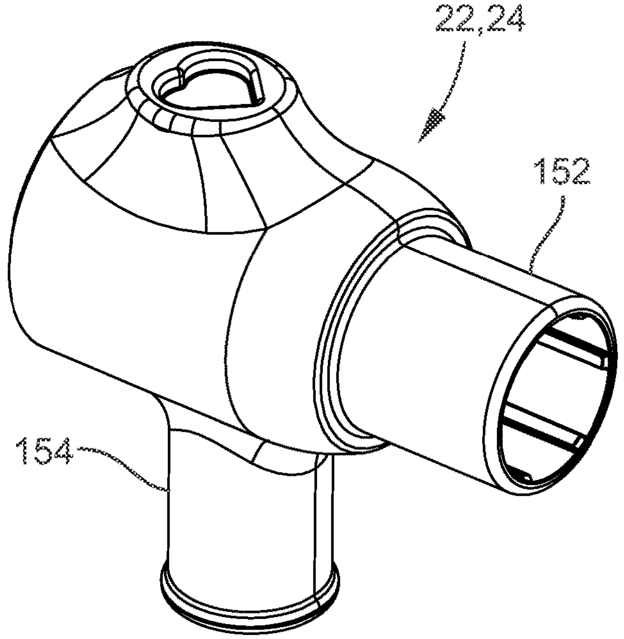
FIG. 22B is a perspective assembled view of the left junction of FIG. 22A taken from a perspective different from FIG. 22A.
Figure 22C:
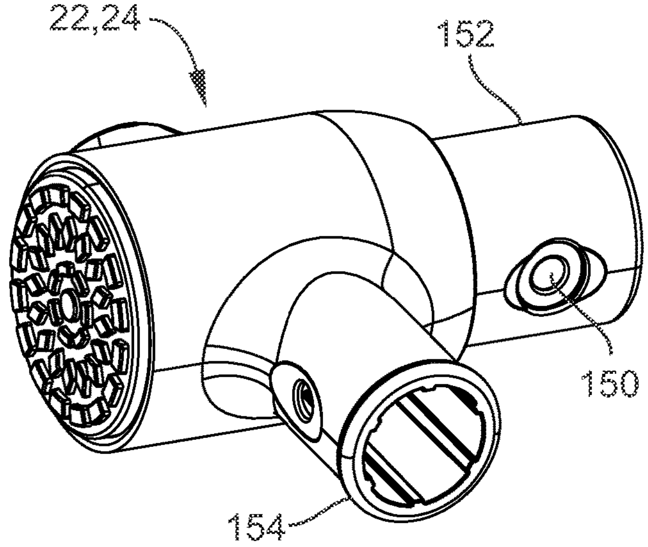
FIG. 22C is a perspective assembled view of the left junction of FIG. 22A taken from a perspective different from FIGS. 22A and 22B.
Figure 23A:
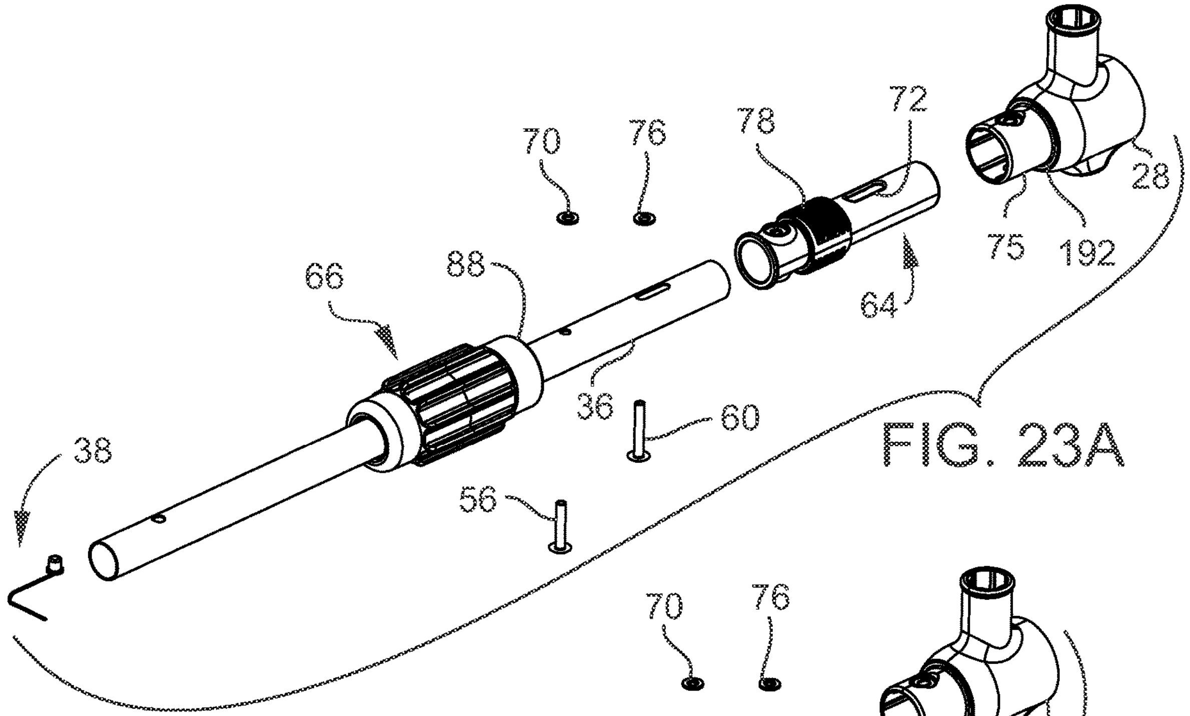
FIG. 23A is a perspective isolated view of the lower right junction, a longitudinal support member, and incremental adjustment mechanism of FIG. 1.
Figure 23B:
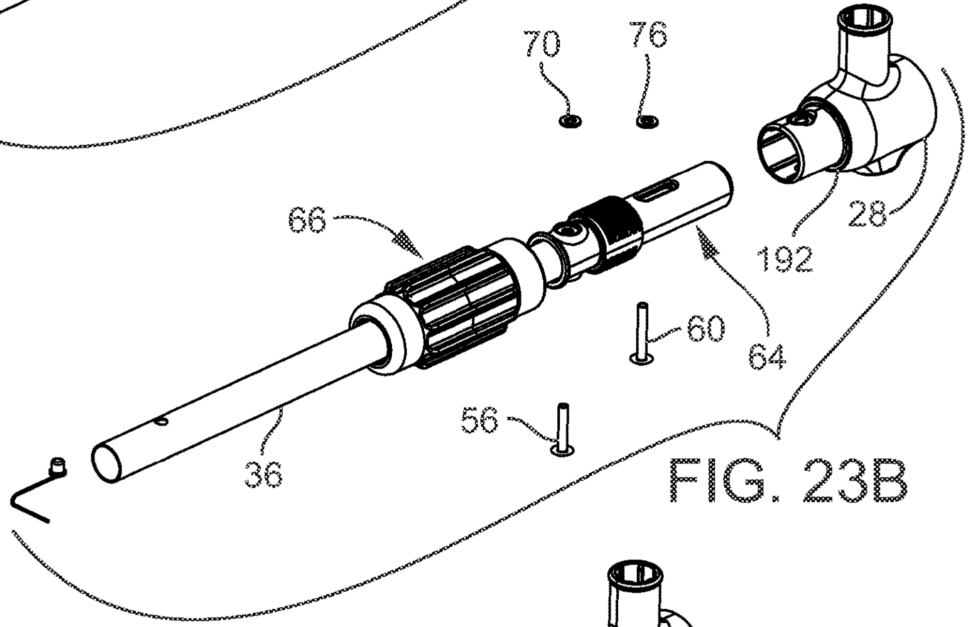
FIG. 23B is a perspective partially assembled view of the lower right junction, longitudinal support member, and incremental adjustment mechanism of FIG. 23A.
Figure 23C:
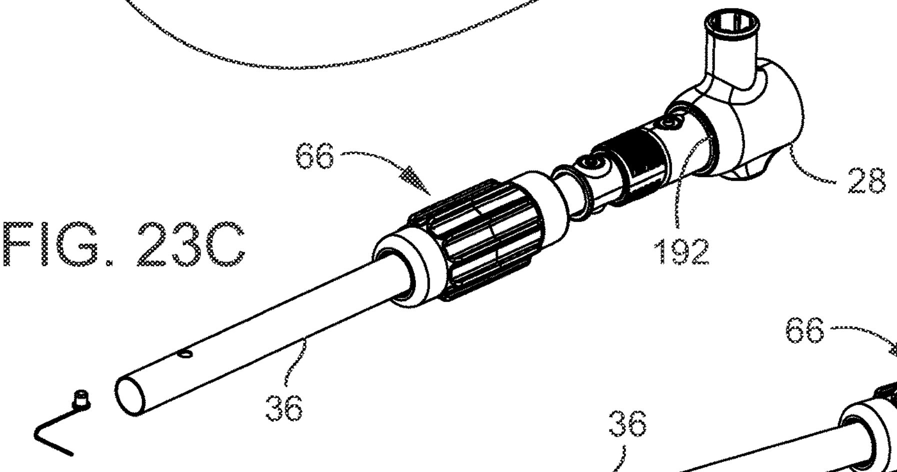
FIG. 23C is a perspective assembled view of the lower right junction, longitudinal support member, and incremental adjustment mechanism of FIG. 23A showing the incremental adjustment mechanism disengaged.
Figure 23D:
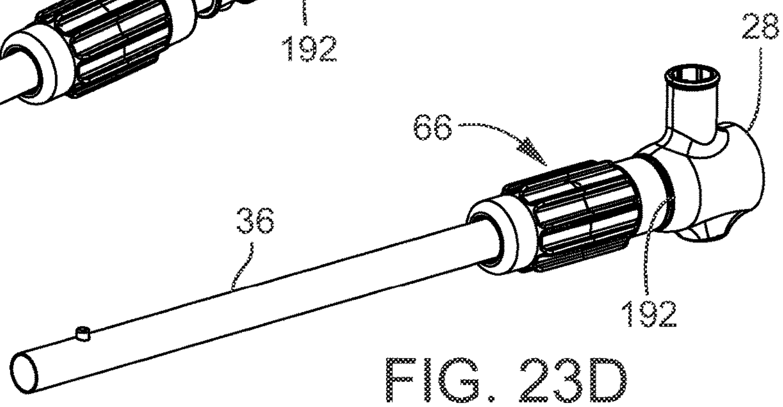
FIG. 23D is a perspective assembled view of the lower right junction, longitudinal support member, and incremental adjustment mechanism of FIG. 23A showing the incremental adjustment mechanism engaged.

Each of the first and second longitudinal support members 14, 16 includes first, second, and third telescoping support member portions 32, 34, 36, which may be referred to as a first longitudinal adjustment mechanism 190. Each of the first, second, and third support member portions 32, 34, 36 is cylindrical and tubular. The lengths of the first, second, and third support member portions 32, 34, 36 are about the same. Third support member portion 36 slides into second support member portion 34 that slides into first support member portion 32. As shown in FIG. 18A, first support member portion 32 includes a button lock 38 that includes a pair of jaws 40 with a button 42. Jaws 40 are resilient such that a pushing down upon button 42 compresses the jaws 40 until the face of the button 42 is about even with or below the level of the outer surface of the first support member portion 32. Then, when such pressure is released, the jaws 40 decompress and push the button 42 beyond the surface of the outer surface of the first support member portion 32. Button 42 extends through an opening 43 in one end of the first support member portion 32. First support member portion 32 further includes a plurality of spaced apart button openings 44 that extend from being adjacent to one end of the first support member portion 32 to adjacent the button 42. The button openings 44 are spaced equidistance from each other. First support member portion 32 further includes an annular stop 46 at one end. Annular stop 46 is preferably formed of an elastomeric or rubber or rubber like material. Annular stop 46 is cylindrical and is engaged with a friction fit on its respective end of the first support member portion 32. Annular stop 46 may have a portion extending slightly beyond the end of the first support member portion 32, which extending portion may include an inner diameter slightly smaller than the inner diameter of the tube of the first support member portion 32, and which extending portion may act as a spacer to slightly space the outside tubular surface of second support member portion 34 from the inside tubular surface of first support member portion 32 when second support member portion 34 slides into first support member portion 32.

As shown in FIG. 18A, second support member portion 34 includes the button lock 38 that includes the pair of jaws 40 with the button 42. Button 42 of second support member portion 34 extends through an opening 48 in one end of the second support member portion 34 and can engage any one of the openings 44 in first support member portion 32 when second support member portion 34 slides into first support member portion 32. Second support member portion 34 further includes a plurality of spaced apart button openings 50 that extend from being adjacent to one end of the second support member portion 34 to about three-fifths of the way to the distal end of second support member portion 34 such that the openings 50, like openings 44 on first support member portion 32, extend more than half of the length and less than the full length of second support member portion 34. The button openings 50 are spaced equidistance from each other. Second support member portion 34 further includes the annular stop 46 at the proximal end. The extending portion may act as a spacer to slightly space the outside tubular surface of third support member portion 36 from the inside tubular surface of second support member portion 34 when third support member portion 36 slides into second support member portion 34.

Figure 24A:
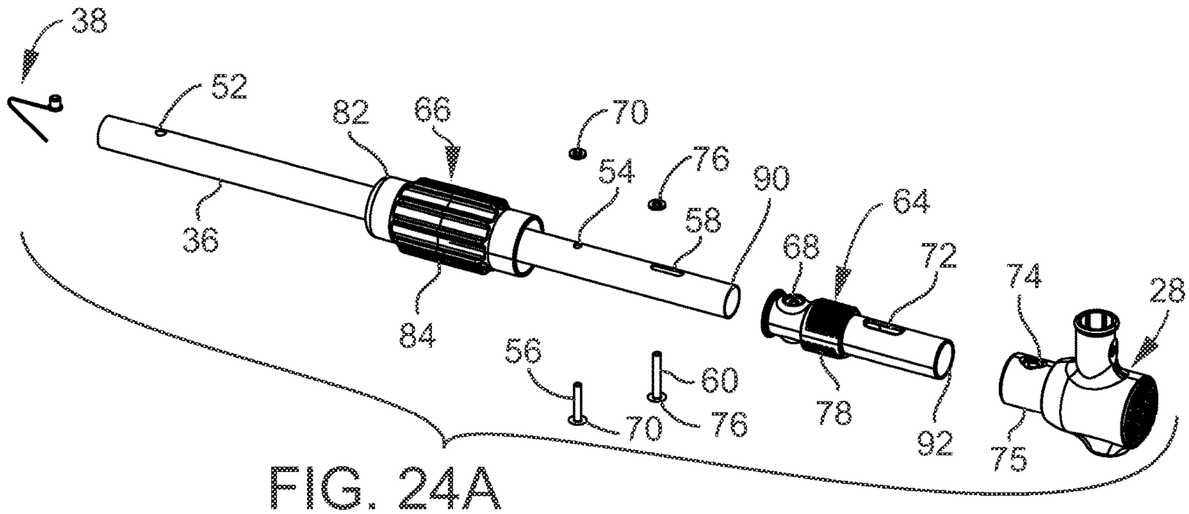
FIG. 24A is a perspective isolated view of the lower right junction, a longitudinal support member, and incremental adjustment mechanism of FIG. 1 taken from a perspective different from FIG. 23A.
Figure 24B:
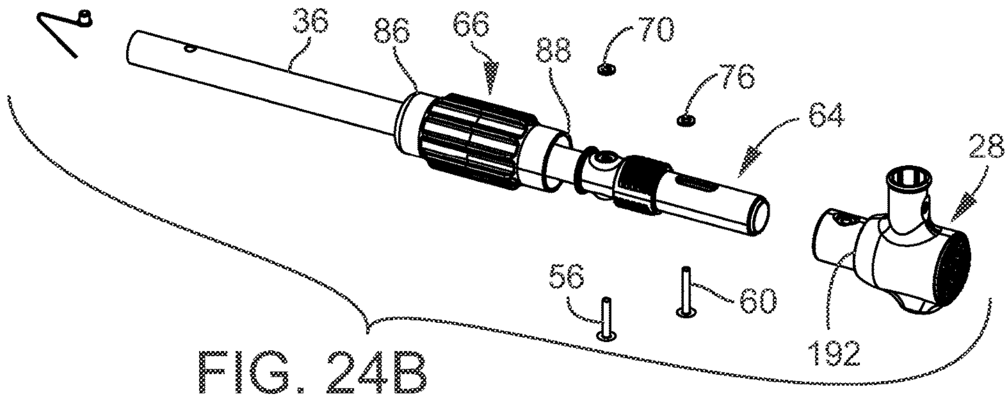
FIG. 24B is a perspective partially assembled view of the lower right junction, longitudinal support member, and incremental adjustment mechanism of FIG. 23B, taken from a perspective different from FIG. 23B.
Figure 24C:
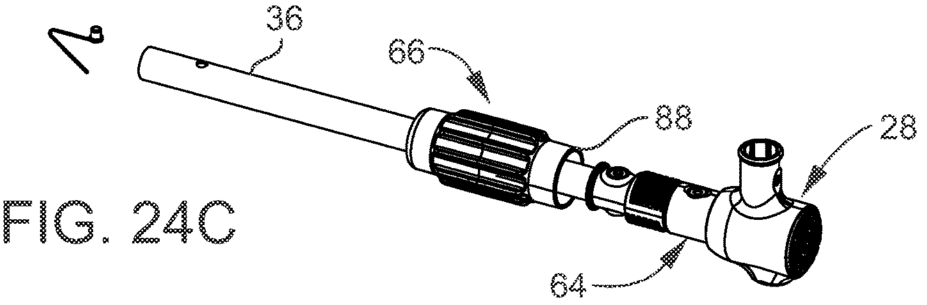
FIG. 24C is a perspective assembled view of the lower right junction, longitudinal support member, and incremental adjustment mechanism of FIG. 23C showing the incremental adjustment mechanism disengaged, taken from a perspective different from FIG. 23C.
Figure 24D:
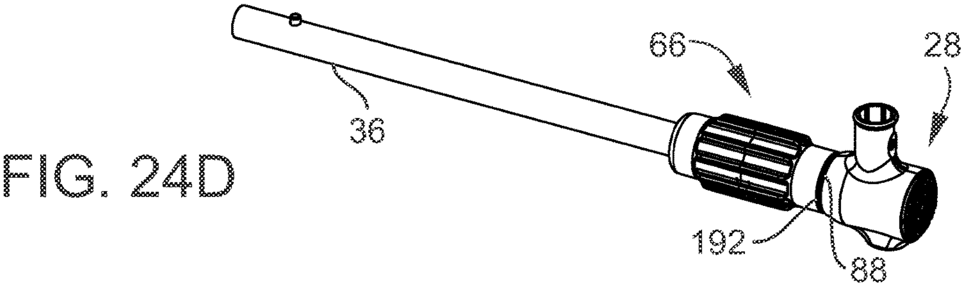
FIG. 24D is a perspective assembled view of the lower right junction, longitudinal support member, and incremental adjustment mechanism of FIG. 23A showing the incremental adjustment mechanism engaged, taken from a perspective different from FIG. 23D.
Figure 25A:
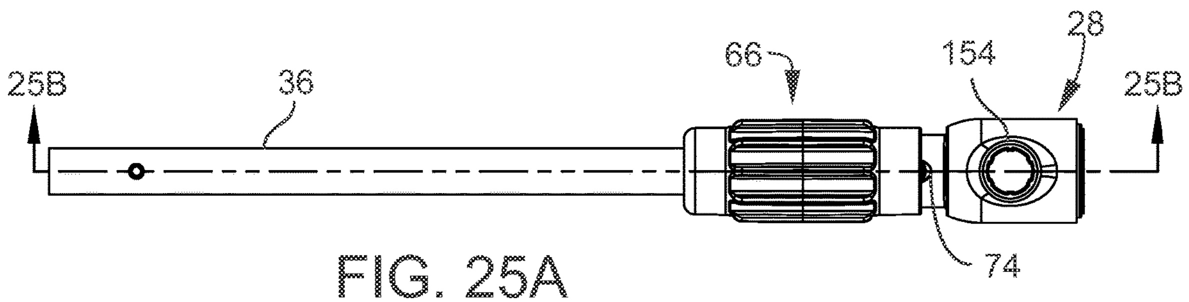
FIG. 25A is a top isolated view of the right corner junction, a longitudinal support member, and the incremental adjustment mechanism of FIG. 1, showing the hand wheel of the incremental adjustment mechanism spaced from and not yet exerting pressure on the right corner junction.
Figure 25B:
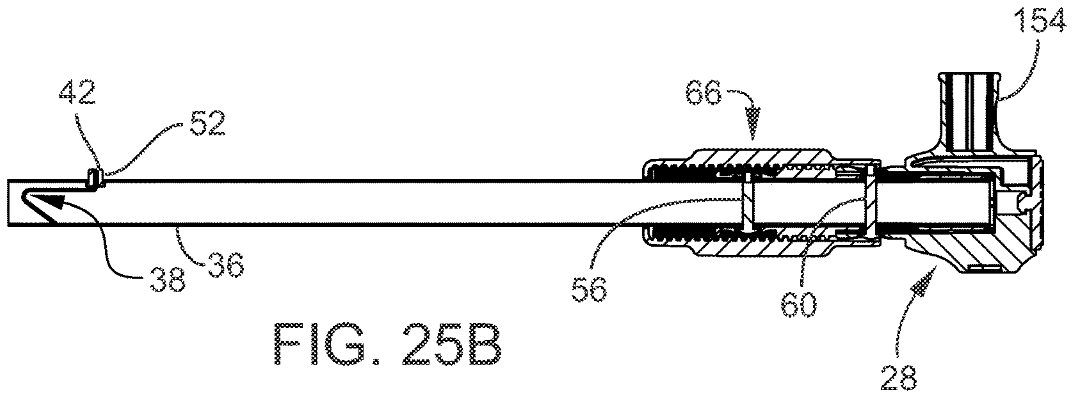
FIG. 25B is a section view of FIG. 25A.
Figure 25C:
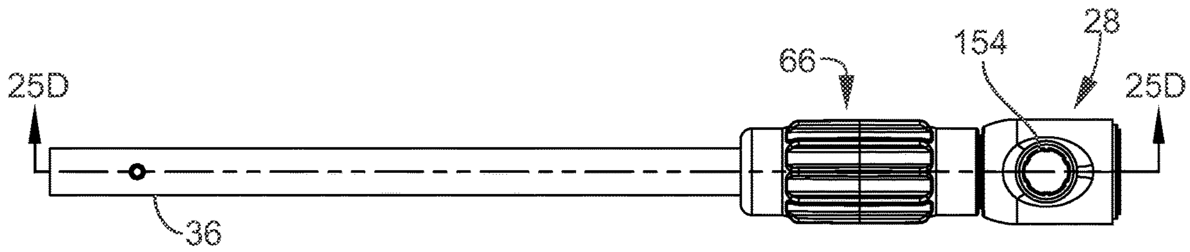
FIG. 25C is a top isolated view of the right corner junction, a longitudinal support member, and the incremental adjustment mechanism of FIG. 1, showing the hand wheel of the incremental adjustment mechanism exerting pressure on the right corner junction.
Figure 25D:
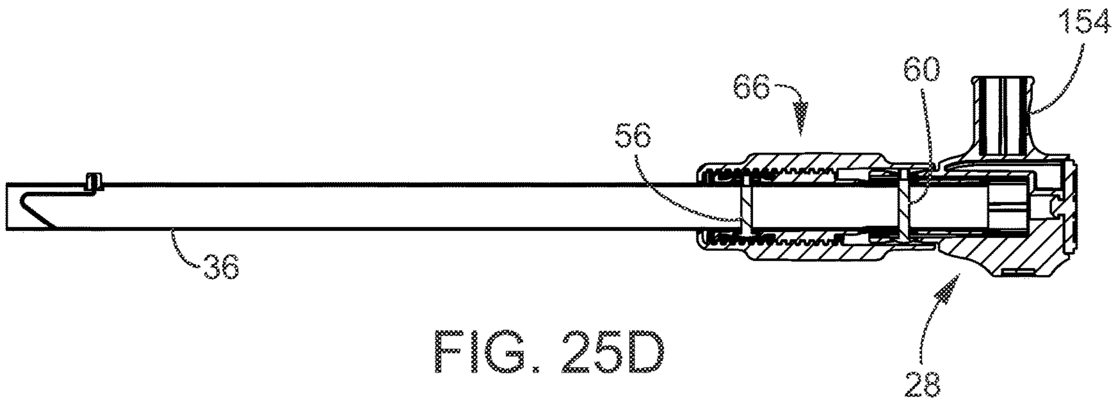
FIG. 25D is a section view of FIG. 25C.
Figure 26B:
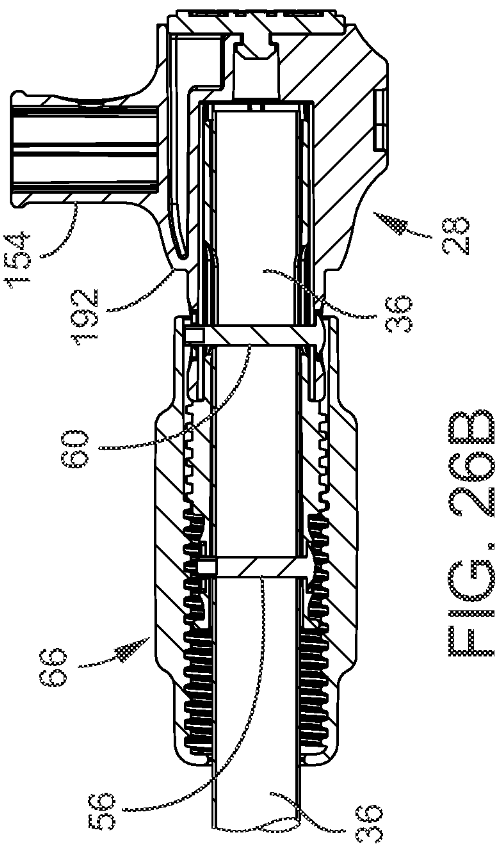
FIG. 26B is a view of a portion of FIG. 25B.
Figure 26D:
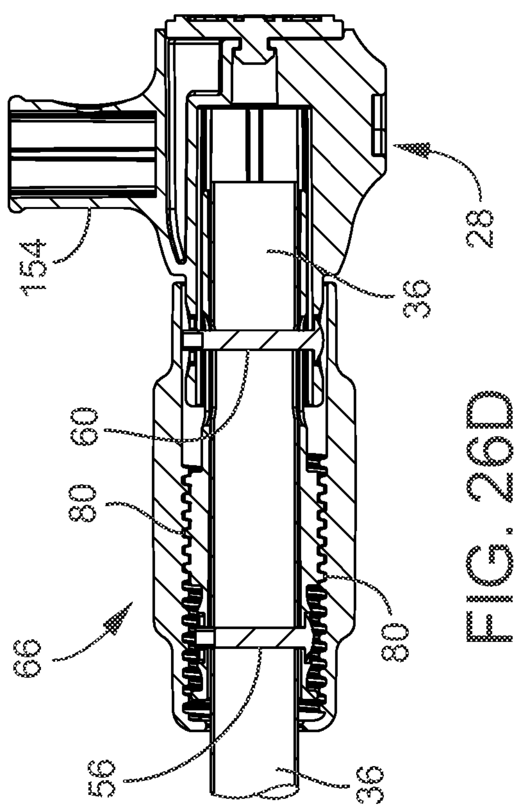
FIG. 26D is a view of a portion of FIG. 25D.
Figure 26A:
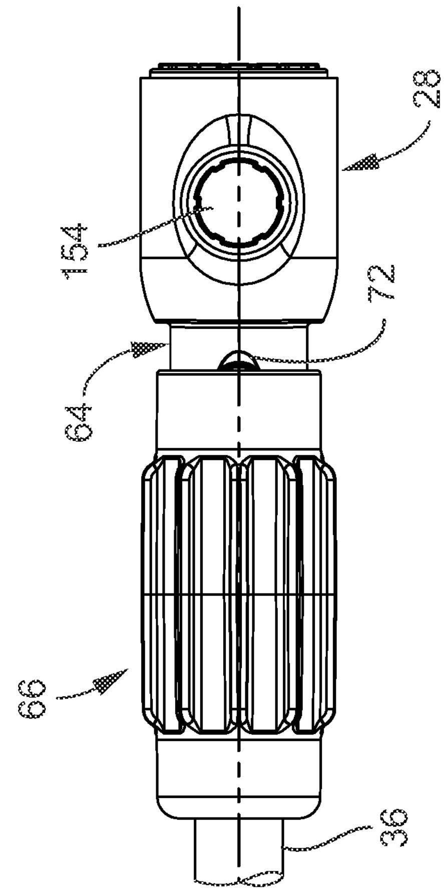
FIG. 26A is a view of a portion of FIG. 25A.
Figure 26C:
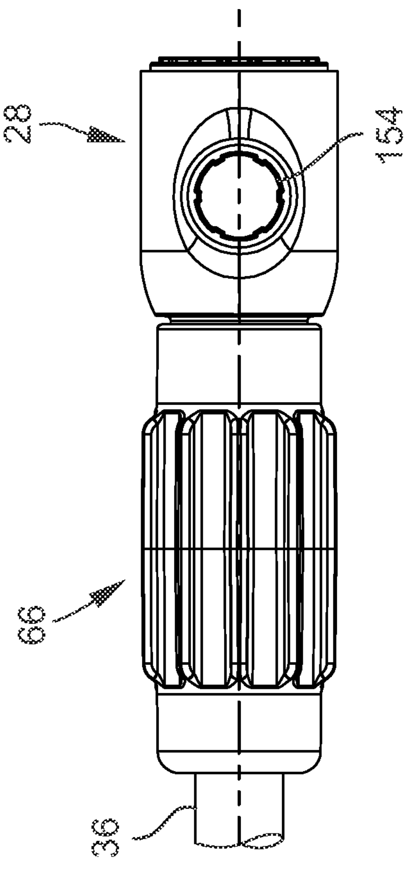
FIG. 26C is a view of a portion of FIG. 25C.

As shown in FIGS. 24A and 25B, third support member portion 36 includes the button lock 38 that includes the pair of jaws 40 with the button 42. Button 42 of third support member portion 36 extends through an opening 52 in the distal end of the third support member portion 36 and can engage any one of the openings 50 in second support member portion 34 when third support member portion 36 slides into second support member portion 34. Third support member portion 36 includes no set of openings like openings 44 and 50 in first and second support member portions 32, 34. However, as shown in FIG. 24A, third support member portion 36 includes a pair of diametrically opposite openings 54 for a pin connector 56 and a pair of diametrically opposite slots 58. Slots 58 are disposed adjacent to a proximal end portion of third support member 36.

Figure 27A:
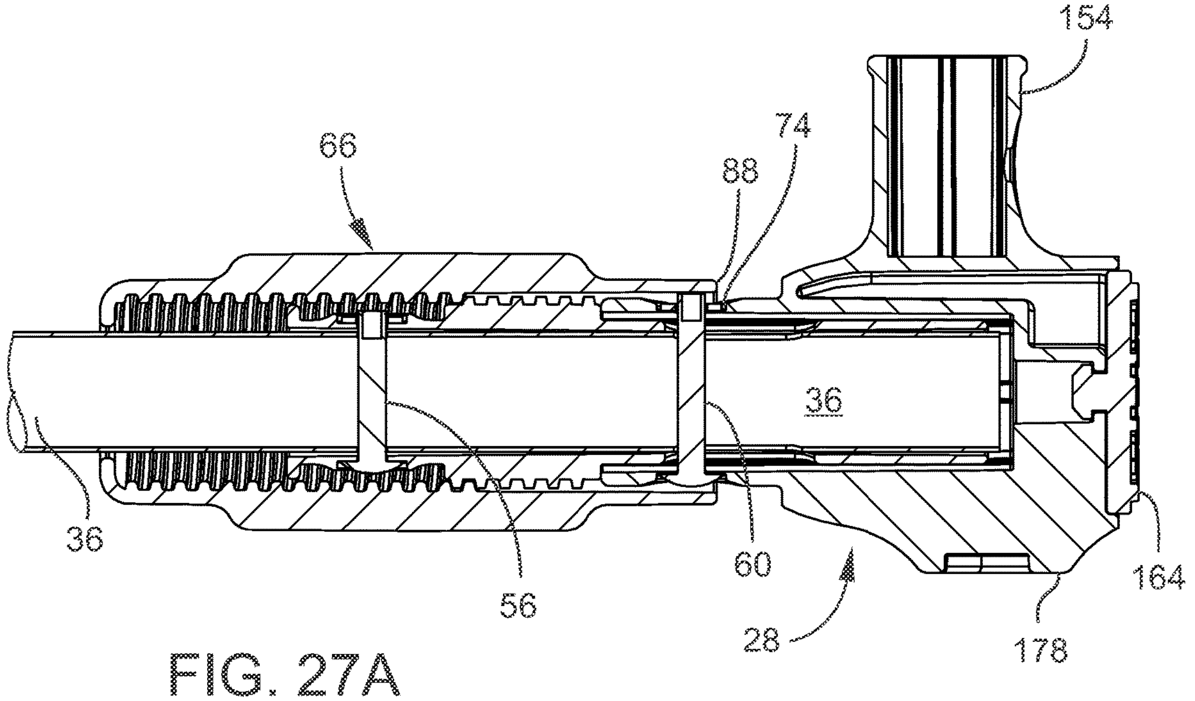
FIG. 27A is a detail view of FIG. 26B.
Figure 27B:
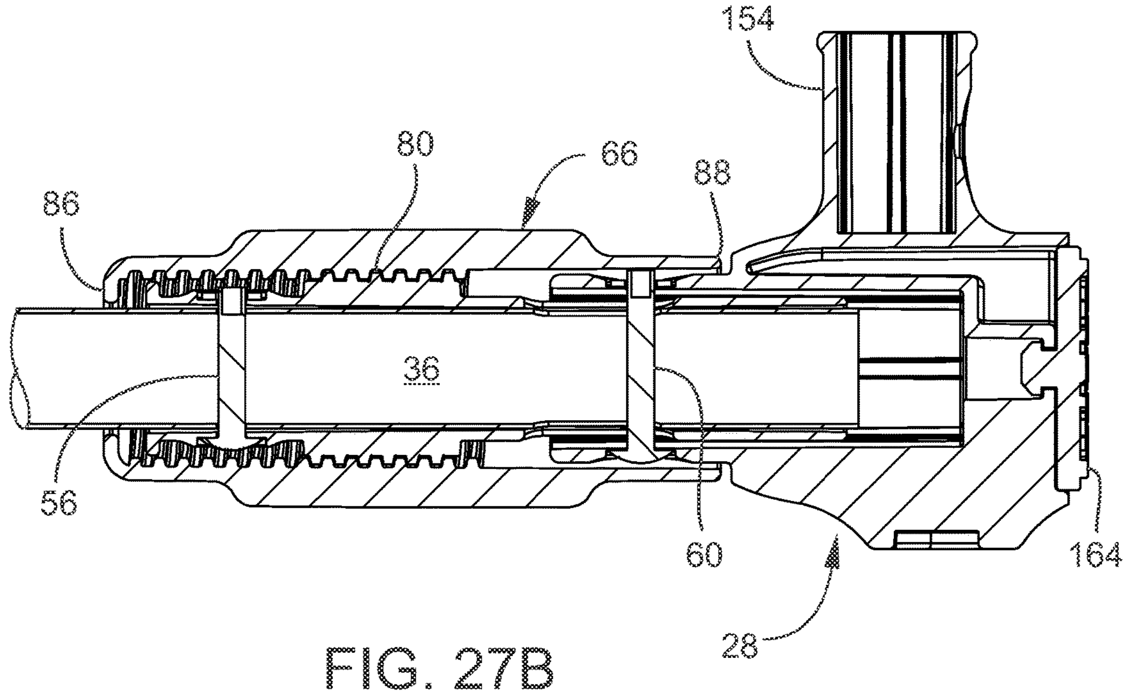
FIG. 27B is a detail view of FIG. 26D.

Third support member portion 36 mounts a second longitudinal adjustment mechanism 62 having an externally threaded piece 64 and an internally threaded piece or hand wheel 66. Externally threaded piece 64 is tubular and slides over the proximal end portion of third support member portion 36. Externally threaded piece 64 includes diametrically opposed openings 68 that align with diametrically opposed openings 54 such that openings 54, 68 receive pin connector 56 or rivet 56 so as to rigidly fix the externally threaded piece 64 to the third support member portion 36 so that, when the third support member portion 36 slides, the externally threaded piece 64 slides at the same time and over the same distance. Third support member portion 34 and externally threaded piece 64 work as one-piece. A boss is formed around openings 68 to receive rivet heads 70. Externally threaded piece 64 includes diametrically opposed slots 72 that align with diametrically opposed slots 58 of the third support member portion 36 such that slots 58, 72 receive pin connector or rivet 60. Pin connector 60 further engages diametrically opposed openings 74 formed in a cylindrical receiver portion 75 of junctions 26, 28. Cylindrical receiver portion 75 includes annular depressions about openings 74 to receive rivet heads 76 of rivet 60. Third support member portion 34 and externally threaded piece 64, as one piece, is slideable to and from junctions 26, 28 in the longitudinal direction but is not removable from junctions 26, 28 without removing pin connector 60 or destroying the integrity of pin connector 60. The distance of such sliding is governed by the ends of slots 58, 72, which ends hit the shaft of the pin connector 60 to stop such axial or longitudinal sliding. Externally threaded piece 64 includes external annular or helical threads 78 disposed between openings 68 and slots 72. External annular threads 78 engage internal annular or helical threads 80, shown in FIG. 27B, of internally threaded piece 66 or hand wheel 66. Hand wheel 66 includes a base cylinder 82 that mounts horizontal ridge portion 84 or roughened grip portion 84. Grip portion 84 includes horizontal ridges and valleys running longitudinally to provide a grip for the user when the user is rotating the hand wheel 66. Hand wheel 66 includes a distal end annular inwardly turned seal 86 having an opening with a diameter about equal to or slightly greater than the outside diameter of the third support member portion 36. On its distal end, the hand wheel 66 includes the seal 86. Opposite of the seal 86 and on its proximal end, the hand wheel 66 includes an annular pusher 88 that pushes upon its respective junction 26, 28 to push the respective junction 26, 28 away the respective proximal ends 90, 92 of the third support member portion 36 and the externally threaded piece 64 such that, when the junctions 26, 28 are so pushed, lateral support members 18, 20 are pushed apart from each other. Annular pusher 88 defines a hand wheel proximal open end of the hand wheel 66. Proximal ends 90, 92 of the third support member portion 36 and the externally threaded piece 64 terminate at about the same axial location. When hand wheel 66 is rotated, the annular pusher 88 or pusher end 88 is drawn relatively to and away from the proximal ends 90, 92. A rotation of the hand wheel 66 such that the hand wheel 66 travels outwardly toward its respective junction 26, 28 is terminated when seal 86 abuts the distal end of external threads 78. A rotation of the hand wheel 66 such that the hand wheel 66 travels inwardly toward the opposite junctions 22, 24 has no stop such that the hand wheel 66 may rotate off of external threads 78 such that the hand wheel 66 may slide the length of the third support member portion 36 until abutting stop 46 on the second support member portion 34. When the length of the longitudinal member 14 is minimized, stop 46 of the first support member portion abuts the stop 46 of the second support member portion 34, which abuts the seal 86 or distal end 86 of the hand wheel 66. Seal 86 or distal end 86 of hand wheel 66 can be referred to as a stop for stopping stop 46 of the second support member portion 34.

Figures 14A, 14B, 14C, 14D:
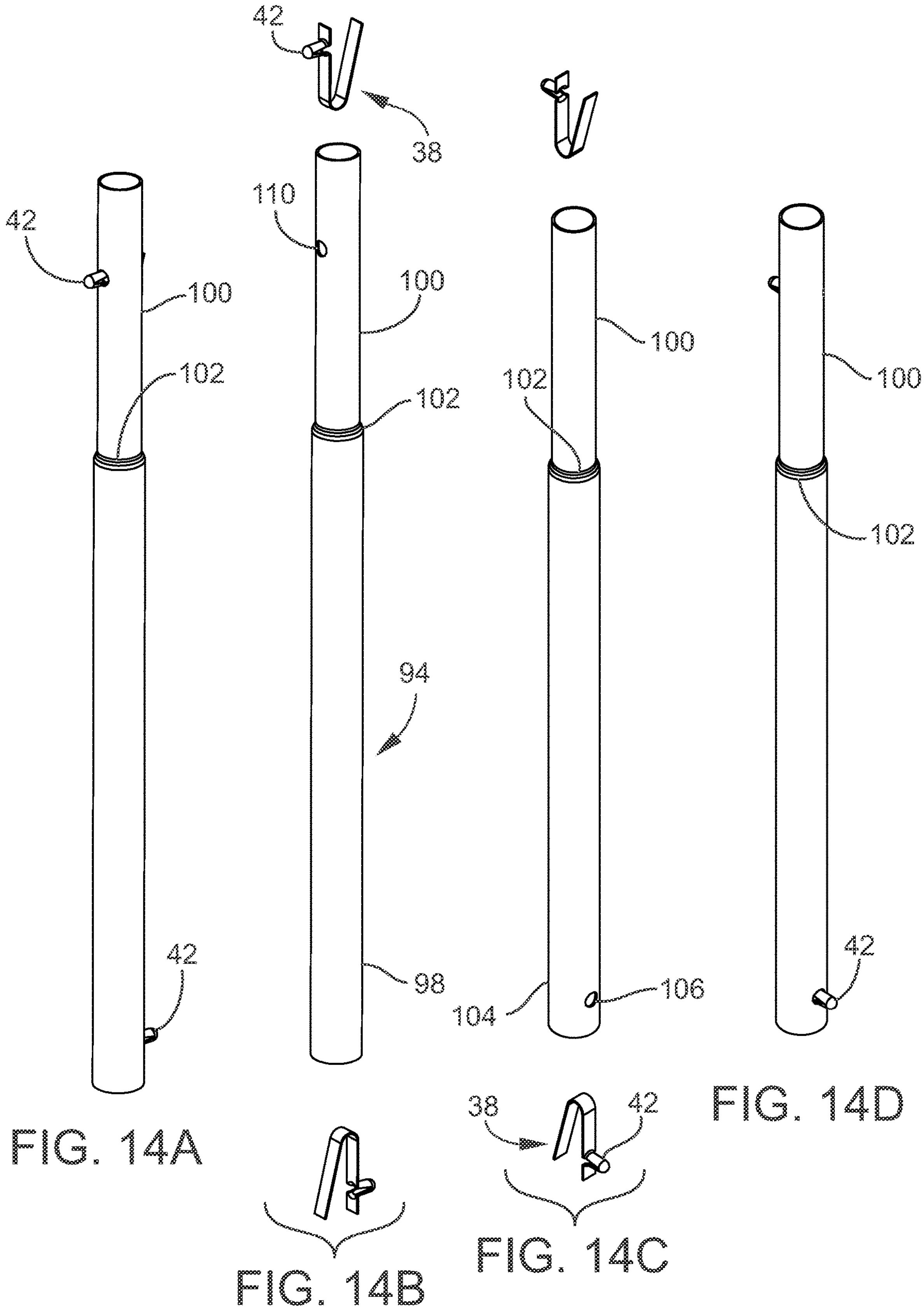
FIG. 14A is a perspective assembled view of the lower lateral support member of the frame of FIG. 1.
FIG. 14B is a perspective disassembled view of the lower lateral support member of FIG. 14A.
FIG. 14C is a perspective disassembled view of the lower lateral support member of FIG. 14A, rotated ninety degrees to show the opening for the button lock in the lower end of the lower lateral support member.
FIG. 14D is a perspective assembled view of the lower lateral support member of FIG. 14C.

As shown in FIG. 1, each of the lateral support members 18, 20 includes a first support member portion 94 and a second support member portion 96. Portions 94, 96 are tubular. As shown in FIG. 14B, first support member portion 94 includes a large diameter section 98 and a smaller or male diameter section 100. Sections 98 and 100 are tubular and cylindrical. A tapered transition or stop 102 is formed at the junction of the large diameter section 98 and male diameter section 100. Large diameter section 98 includes an end portion 104 having an opening 106. A button lock 38 resides in the end portion 104 with the button 42 extending into, through, and beyond the opening 106. Male section 100 includes an end portion 108 having an opening 110. A button lock 38 resides in the end portion 108 with the button 42 extending into, through, and beyond the opening 110.

Figure 15A:
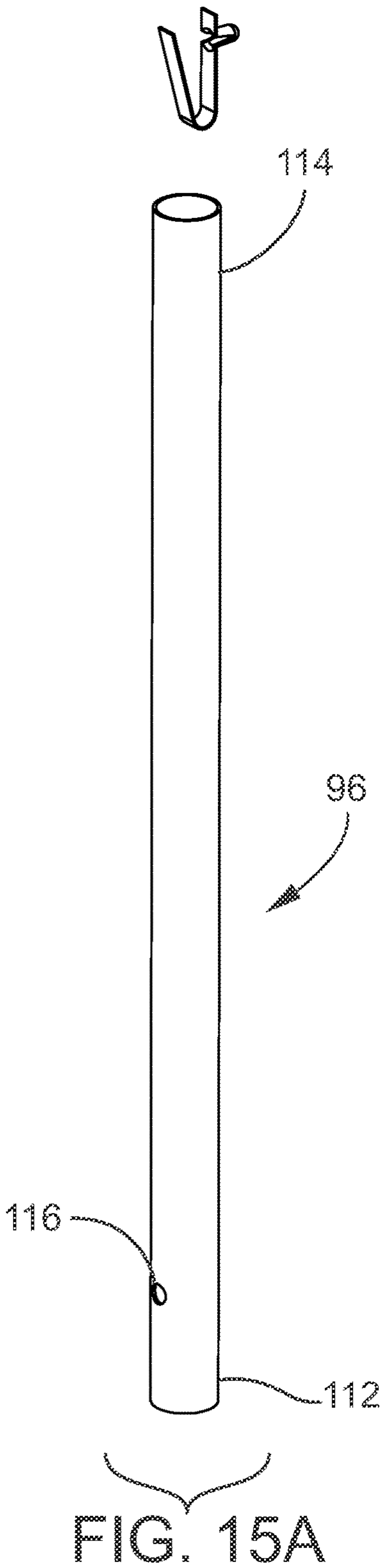
FIG. 15A is a perspective disassembled view of the upper lateral support member of one of the sides of the frame of FIG. 1.
Figure 15B:
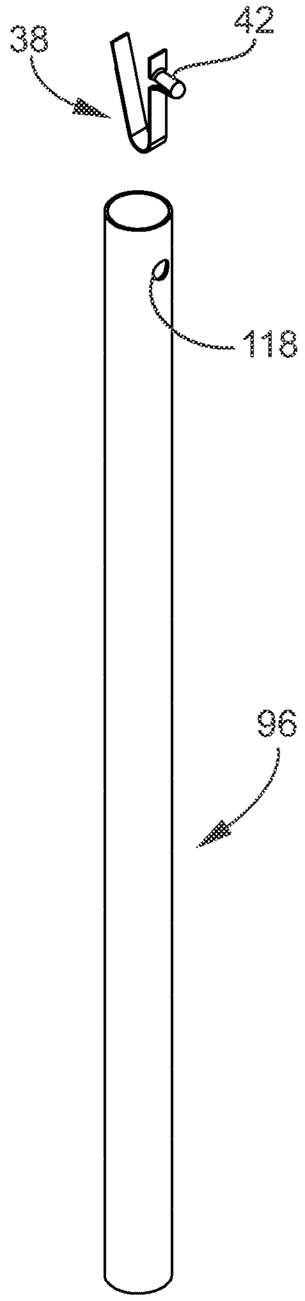
FIG. 15B is a perspective disassembled view of the upper lateral support member of the FIG. 15A to show the opening for the button lock at an upper end of the upper lateral support member.
Figure 15C:
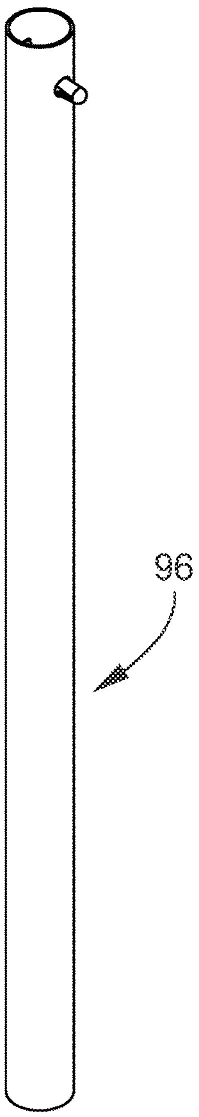
FIG. 15C is a perspective assembled view of the upper lateral support member of FIG. 15D.
Figure 16A:
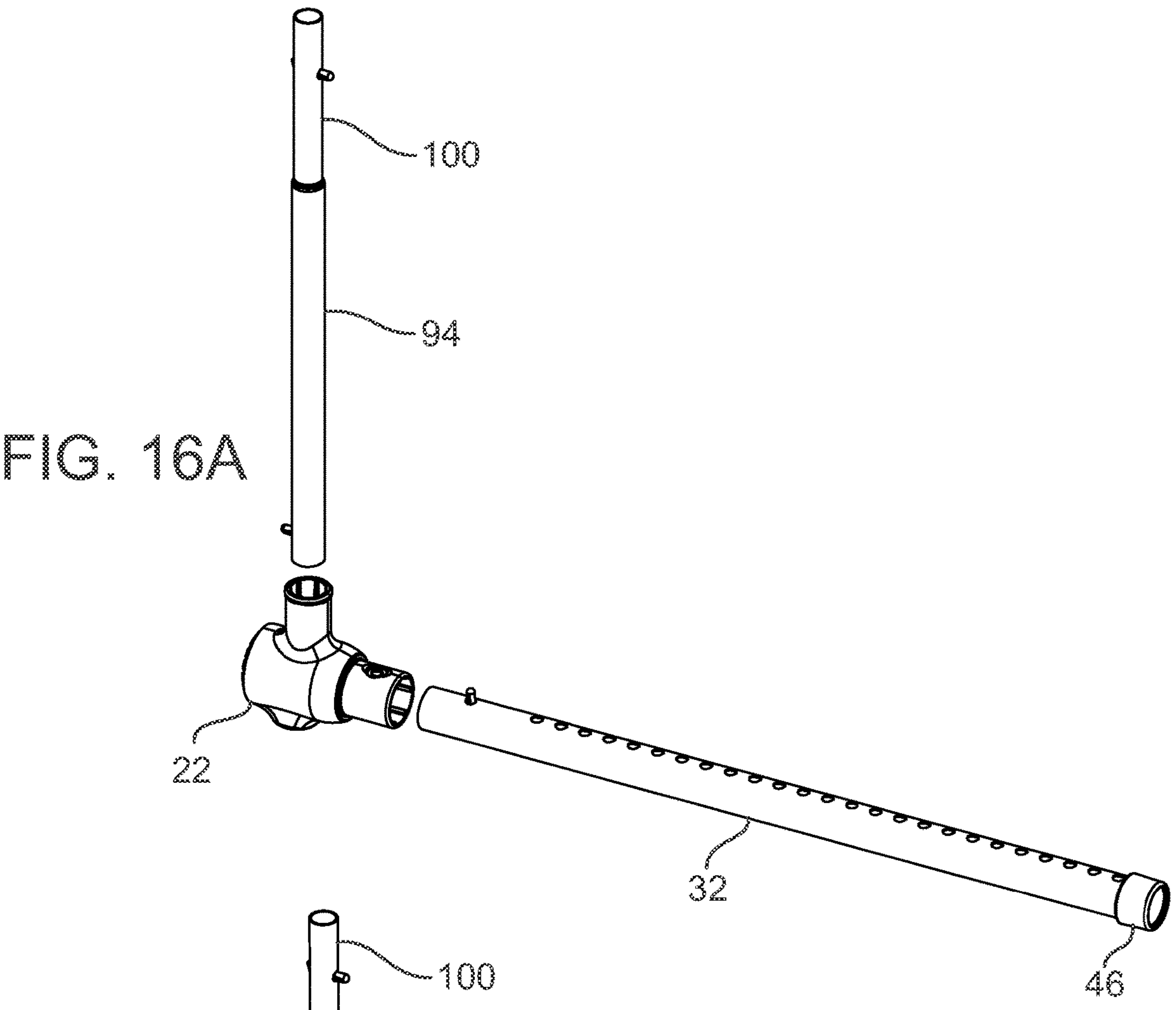
FIG. 16A is a perspective disassembled view of the lower left junction of the frame of FIG. 1.
Figure 16B:
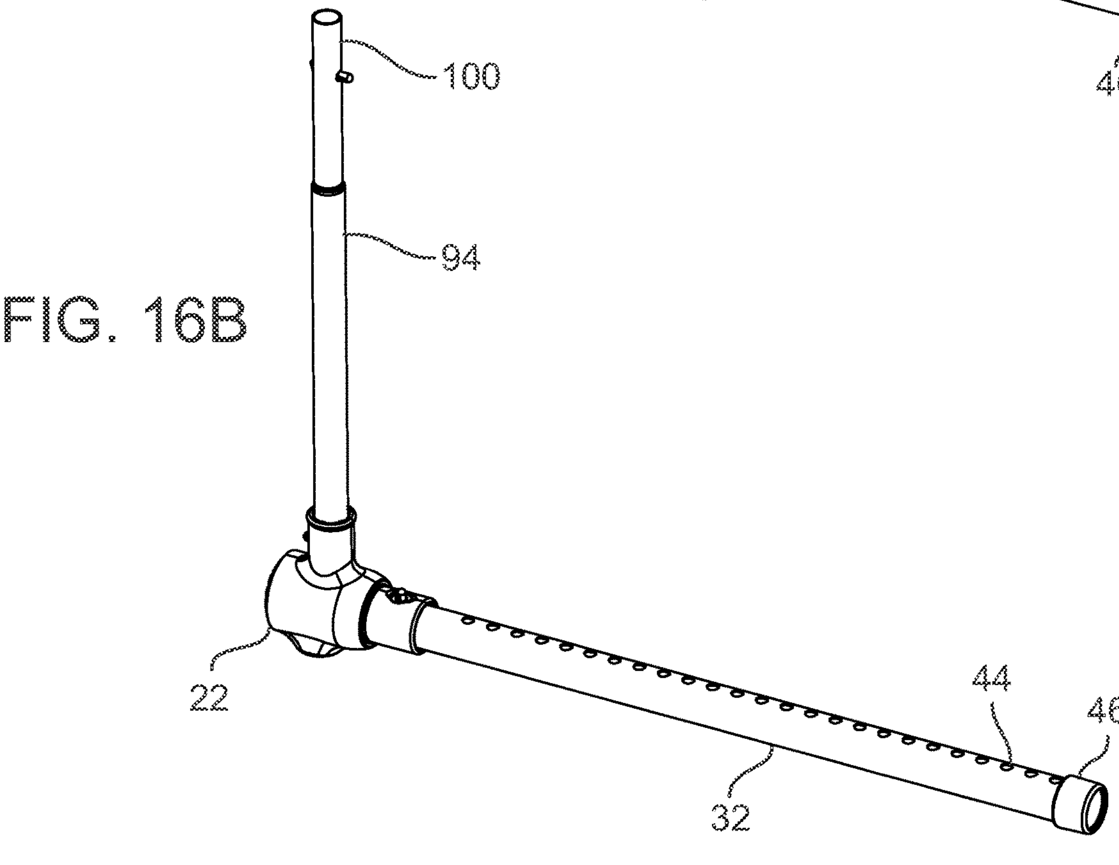
FIG. 16B is a perspective assembled view of the lower left junction of FIG. 16A.
Figure 17A:
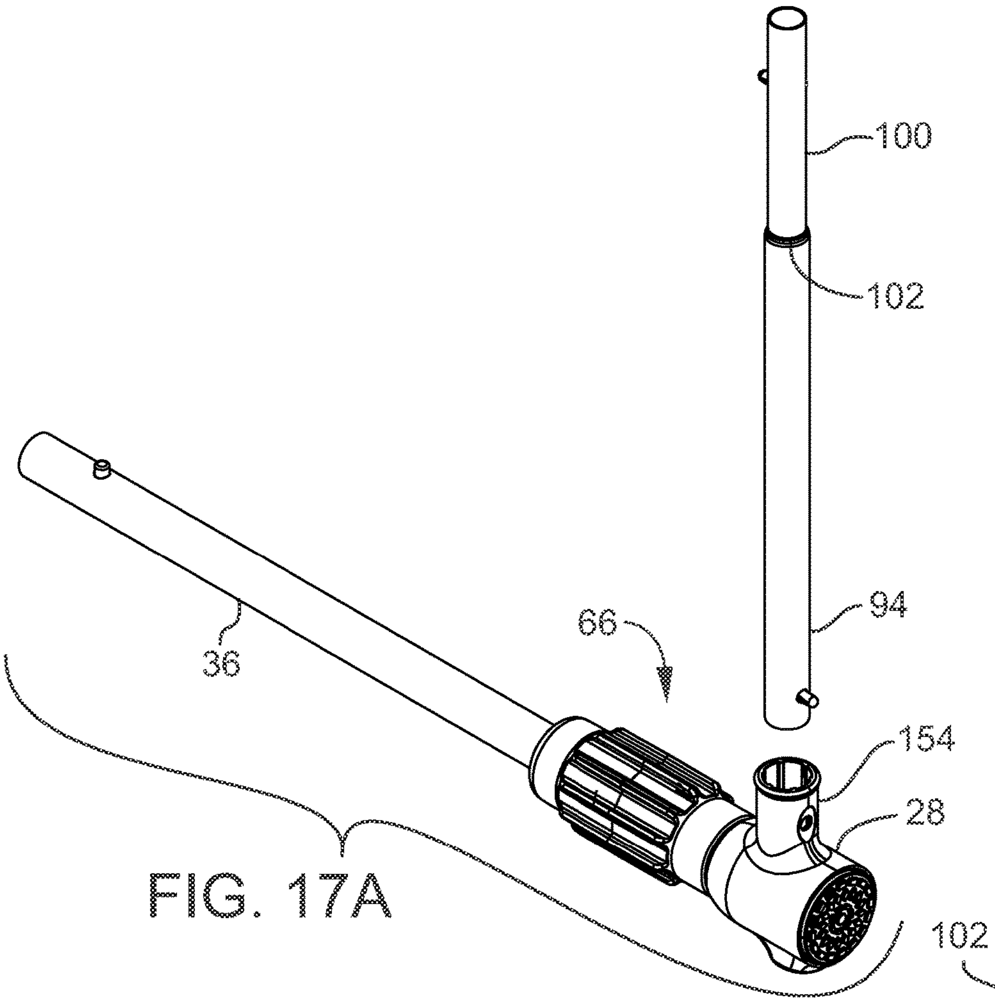
FIG. 17A is a perspective partially disassembled view of the lower right junction of the frame of FIG. 1.
Figure 17B:
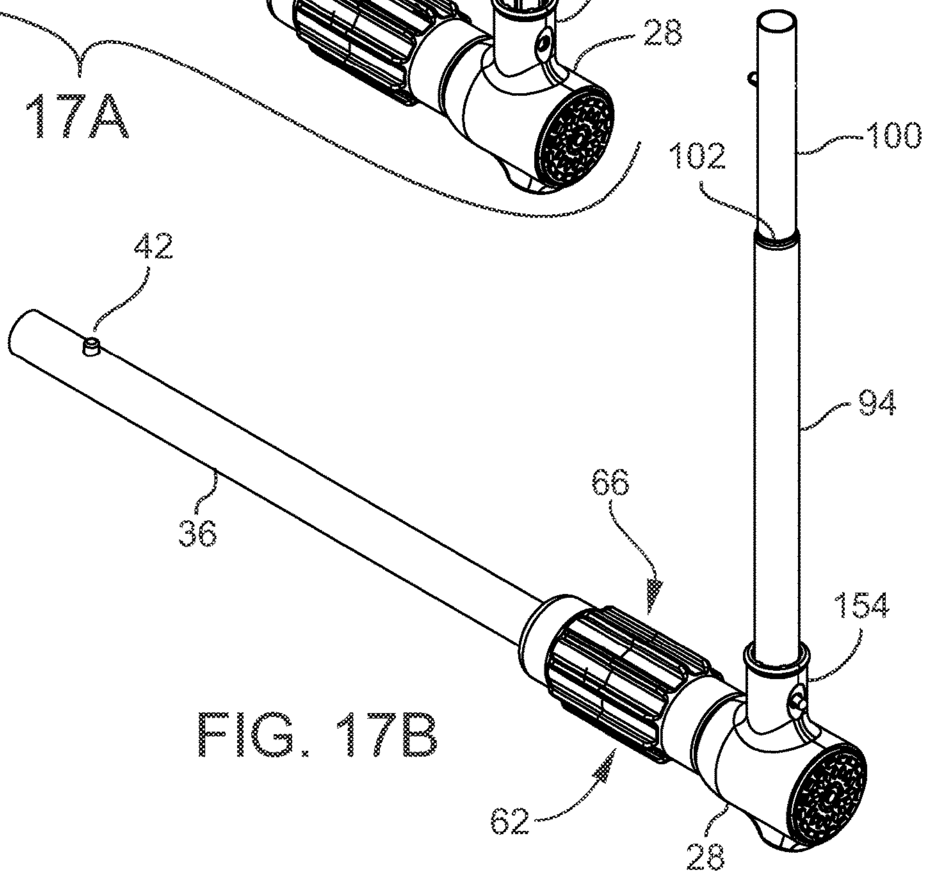
FIG. 17B is a perspective assembled view of the lower right junction of FIG. 17A.

Second support member 96 is shown in FIGS. 15A, 15B, and 15C. Second support member 96 is tubular and cylindrical. Second support member 96 includes a first end portion 112 and a second end portion 114. First end portion 112 includes an opening 116 for the button 42 of the button lock 38 of the male section 100 of first support member 94. First end portion 112 is a female end portion 112. Second end portion 114 includes a button lock 38 and an opening 118. Button 42 of button lock 38 of the second end portion 114 extends into, through, and beyond opening 118.

Figures 12A, 12B, 12C, 12D:
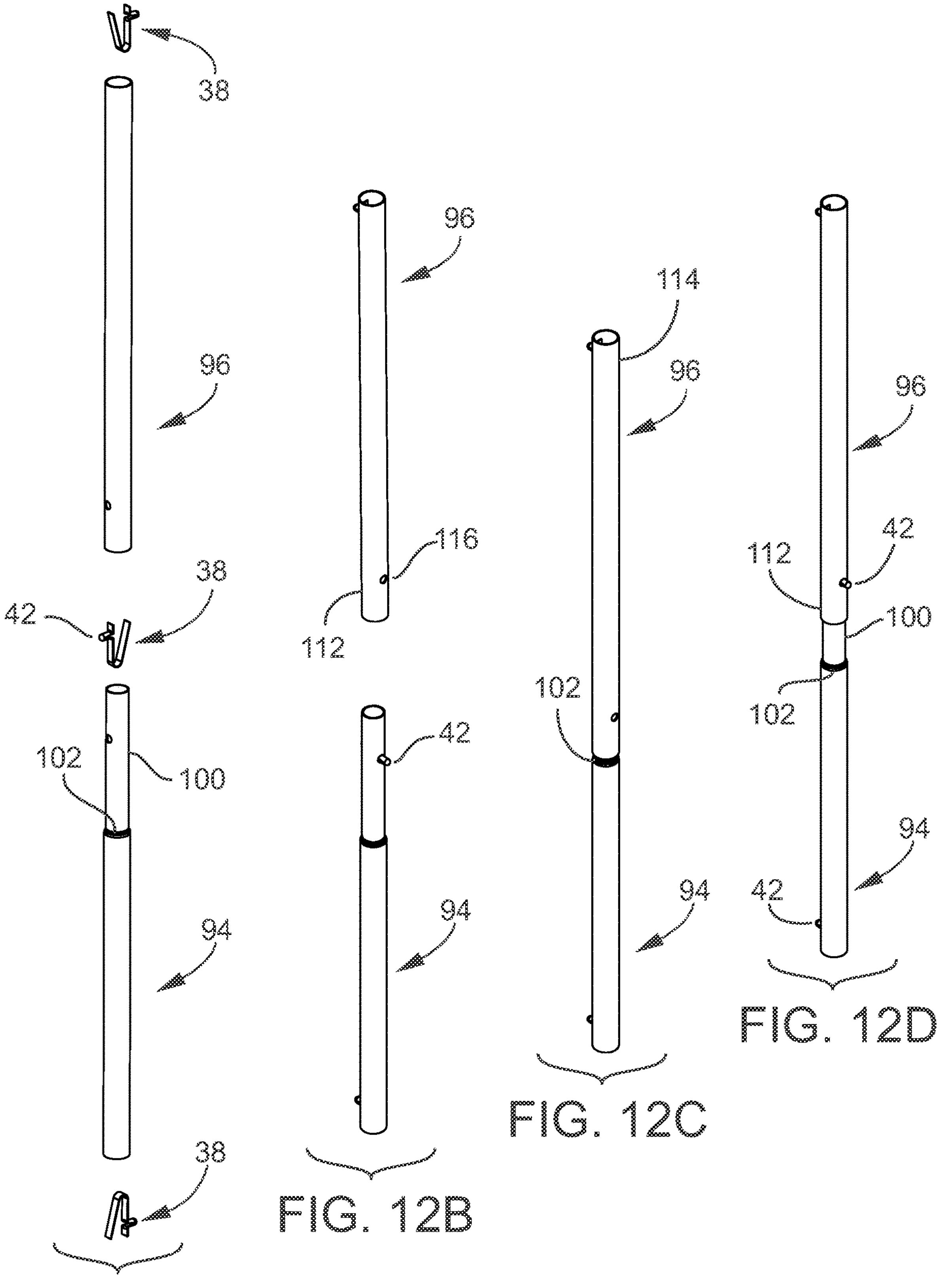
FIG. 12A is a perspective isolated exploded disassembled view of the lateral support members of the one side of the frame of FIG. 1.
FIG. 12B is a perspective isolated exploded assembled view of the lateral support members of FIG. 12A.
FIG. 12C is a perspective isolated view of the lateral support members of FIG. 12A fully slid into each other until the upper support member engages the stop of the lower support member to show the maximum retracted state of the lateral support members of FIG. 12A, with such state being utilized to engage the sheeting to the frame.
FIG. 12D is a perspective view of the lateral support members of FIG. 12A showing the lateral support members engaged or locked to each other, with such state utilized to draw and maintain the sheeting taut.
Figure 13A:
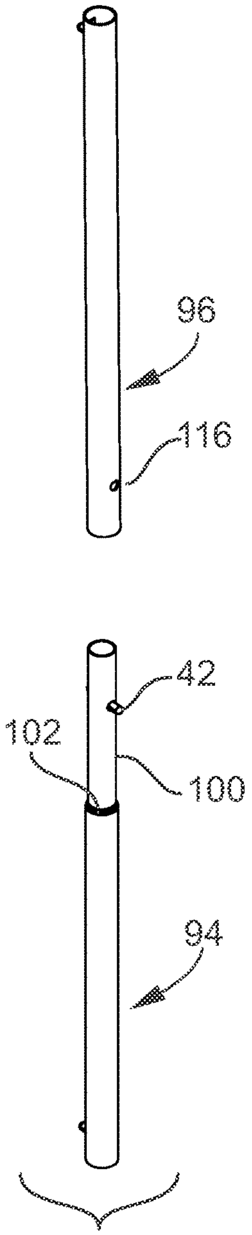
FIG. 13A is a perspective exploded view of the lateral support members of a side of the frame of FIG. 1.
Figure 13B:
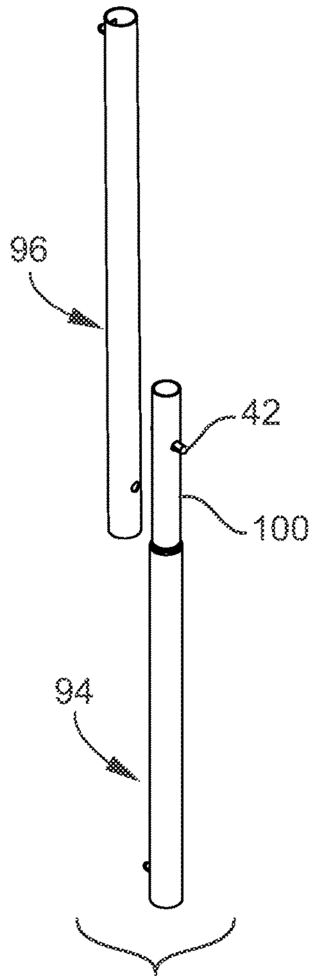
FIG. 13B is a perspective exploded view of the lateral support members of FIG. 13A, showing the upper and lower support members side by side and showing the position of the button lock when the upper lateral support member has been stopped by the stop of the lower lateral support member, where the button lock is spaced from its associated opening in the upper lateral support member, where the lateral support members are in their maximum retracted state, and where the sheeting has a relaxed state.
Figure 13C:
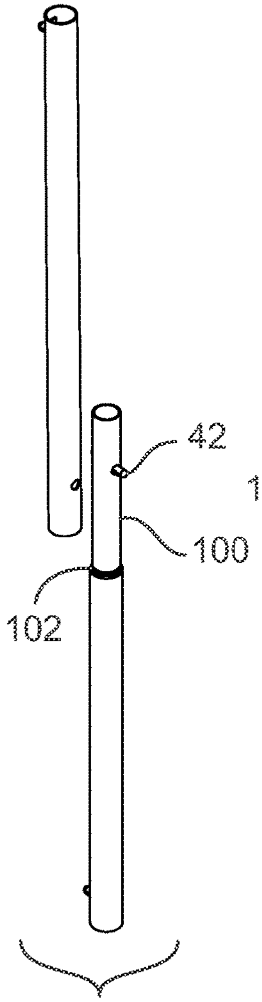
FIG. 13C is a perspective exploded view of the lateral support members of FIG. 13A, showing the upper and lower support members side by side and showing a position of the button lock when the lower end of the upper lateral support member is spaced from the stop of the lower lateral support member, where the button lock is spaced from its associated opening in the upper lateral support member, and where the sheeting has a relaxed state.
Figure 13D:
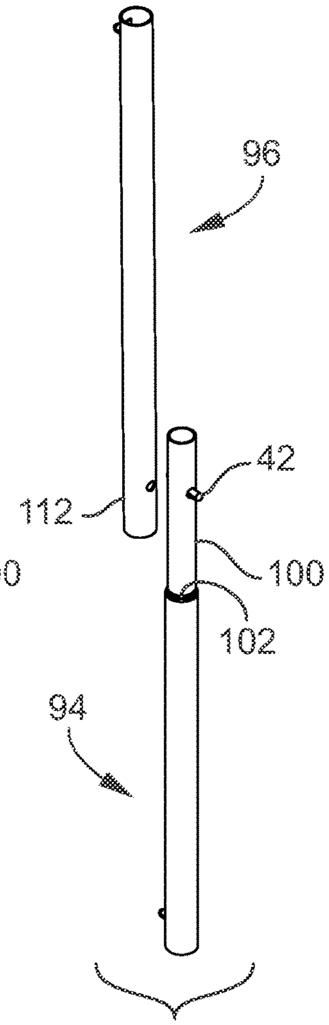
FIG. 13D is a perspective exploded view of the lateral support members of FIG. 13A showing the upper and lower support members side by side and showing the position of the button lock when it is engaged in its associated opening in the upper lateral support member, where the lower end of the upper lateral support member is spaced from the annular stop of the lower lateral support member, and where the sheeting has a taut state.

As shown in FIGS. 12D and 13D, support member portions 94, 96 are fixed relative to each other when the button lock 42 of the male section 100 engages the opening 116 of female end portion 112. At this position, support member portions 94, 96 define a fixed length of the lateral support members 18, 20.

As shown in FIGS. 12C and 13B, support members portions 94, 96 have been fully retracted relative to each other to where the female end portion 112 abuts the stop 102 of the first support member portion 94 so as to minimize the length of lateral support members 18, 20 and so as to minimize the distance between the longitudinal support members 14, 16. In this position, the button 42 of the button lock 38 does not extend through an opening. Instead, the button 42 is pressing against the inside surface of the female end portion 112 of support member 96. In this position, the sheeting 30 is in a relaxed state where components or units of the frame 12 can be inserted into and removed from the sleeves of the sheeting 30. In other words, to remove sheeting 30 from the frame 12, lateral support member portions 94, 96 are pushed into each other instead of being taken apart or separated from each other.

FIG. 13C shows an intermediate position for the first and second support member portions 94, 96. Here, button 42 of the button lock 38 of the male section 100 does not extend through any opening and is pressing against the inside surface of female section 112. Here, female end section 112 is spaced from stop 102.

FIGS. 12A, 12B, and 13A are included to, for example, show the entire length of the support member portions 94 and 96 and to show that button locks 38 are included in the support member portions 94, 96.

The outside diameter of second support member portion 96 is equal to the outside diameter of the large section 98 of first support member portion 94. The inside diameter of the second support member portion 96 is slightly greater than or about equal to the inside diameter of male section 100 of first support member portion 94.

As shown in FIG. 4, sheeting 30 includes a first longitudinal sleeve 120 for engaging first longitudinal support member 14, a second longitudinal sleeve 122 for engaging second longitudinal support member 16, a first lateral sleeve 124 for engaging first lateral support member 18, and a second lateral sleeve 126 for engaging second lateral support member 20. Sleeves 120 are formed of a flexible material. Sleeve 120 includes open ends 128, 130. Sleeve 122 includes open ends 132, 134. Sleeve 124 includes open ends 136, 138. Sleeve 126 includes open ends 140, 142. Each of the sleeves 120, 122, 124, 126 forms a loop and includes two sides that are engaged, such as by stitching, to a central sheeting portion 144. Central sheeting portion 144 includes a longitudinal intermediate sheeting portion 146, a lateral intermediate sheeting portion 147, and a mesh portion 148. Each of the intermediate sheeting portion 148 and mesh portion 150 is formed of a flexible material. To provide tautness or tightness to the sheeting 30 when the lateral support members 18 and 20 are in the fixed position, the sheeting 30 as a whole may be formed of a resilient or non-resilient flexible material, with the tautness or tightness being provided by selecting the lateral length of sheeting 30 to be about the lateral distance as the distance between first and second longitudinal support members 14, 16. And/or such tautness and tightness may be provided by selecting a resilient material for one or more of lateral intermediate sheeting portion 147, mesh portion 148, longitudinal sleeve portions 120, 122, and longitudinal intermediate portion 146. Mesh portion 148 may be see-through so that a user can see through the mesh portion 148. Sheeting portions 120, 122, 124, 126, 146, 147, and 148 where adjacent to each other may be engaged to such other adjacent portion by, for example, being stitched to such other adjacent portion. By bypassing junctions 26, 28, sheeting 30 provides access to hand wheels 66. By bypassing junctions 22, 24, 26, 28, sheeting 30 provides access to the quick connect button locks 38, two of which engage junction 22, two of which engage junction 24, one of which engages junction 26, and one of which engages junction 28.

Junction 22 is identical to junction 24.

Junction 26 is identical to junction 28.

Junctions 22, 24 are identical to junctions 26, 28 except that junctions 26, 28 have opposing diametrical openings 74 for pin connector 60 in cylindrical receiver portion 75 while junctions 22, 24 have a single opening 150 in their respective longitudinally extending cylindrical receiving portions 152 for button 42 of button lock 38 of first support member portion 32 of longitudinal support members 14, 16.

Each of junctions 22, 24 have the longitudinal extending cylindrical receiving portion 152 that receives and engages the first support member portions 32 and a laterally extending cylindrical receiving portion 154 that receives and engages one of the first and second lateral support member portions 96, 94. Cylindrical receiving portions 152, 154 are disposed at right angles to each other such that adjacent lateral and longitudinal support members 14, 16, 18, 20 extend at right angles to each other, such that opposing lateral support members 18, 20 extend parallel to each other, and such that opposing longitudinal support members 14, 16 extend parallel to each other.

Each of junctions 26, 28 have the longitudinal extending cylindrical receiving portion 75 that receives and engages the third support member portion 36 and externally threaded piece 64 and a laterally extending cylindrical receiving portion 154 that receives and engages one of the first and second lateral support member portions 96, 94. Cylindrical receiving portions 75, 154 are disposed at right angles to each other such that adjacent lateral and longitudinal support members 14, 16, 18, 20 extend at right angles to each other, such that opposing lateral support members 18, 20 extend parallel to each other, and such that opposing longitudinal support members 14, 16 extend parallel to each other.

Laterally extending cylindrical receiving portion 154 of each of the junctions 22, 24, 26, 28 includes an opening 156 for the button 42 of the button lock 38 of one of the first and second support members 94, 96 of the lateral support members 18, 20.

Each of the junctions 22, 24, 26, 28 includes an integral spoked mount 158 having seven radially extending spokes 160 extending from an integral apertured central portion 162. In junctions 22, 24, spoked mount 158 is opposite of the longitudinal receiving section 152. In junctions 26, 28, spoked mount 158 is opposite of longitudinal receiving section 75. Spoked mount 158 receives a disk shaped bumper 164 having an outer roughened surface 166. On its inner surface, bumper 164 includes a snap connector 168 that snaps into the aperture central portion 162. Disposed between the spoked mount 158 and the bumper 164 is an apertured disk 170 having a central opening 172. Snap connector 168 extends through central opening 172 of apertured disk 170. Bumper 164 engages a vertical surface such as a door jamb.

Each of the junctions 22, 24, 26, 28 is sufficiently small to pass through each of the sleeves 120, 122, 124, 126.

Each of the junctions 22, 24, 26, 28 is quickly engagable to and quickly disengagable from its respective lateral support members 18, 20 by the respective button locks 38 of the lateral support members 18, 20.

Each of the junctions 22, 24 is quickly engagable to and quickly disengagable from its respective longitudinal support members 14, 16 by the respective button locks 38 of the first support members 32.

Figure 3:
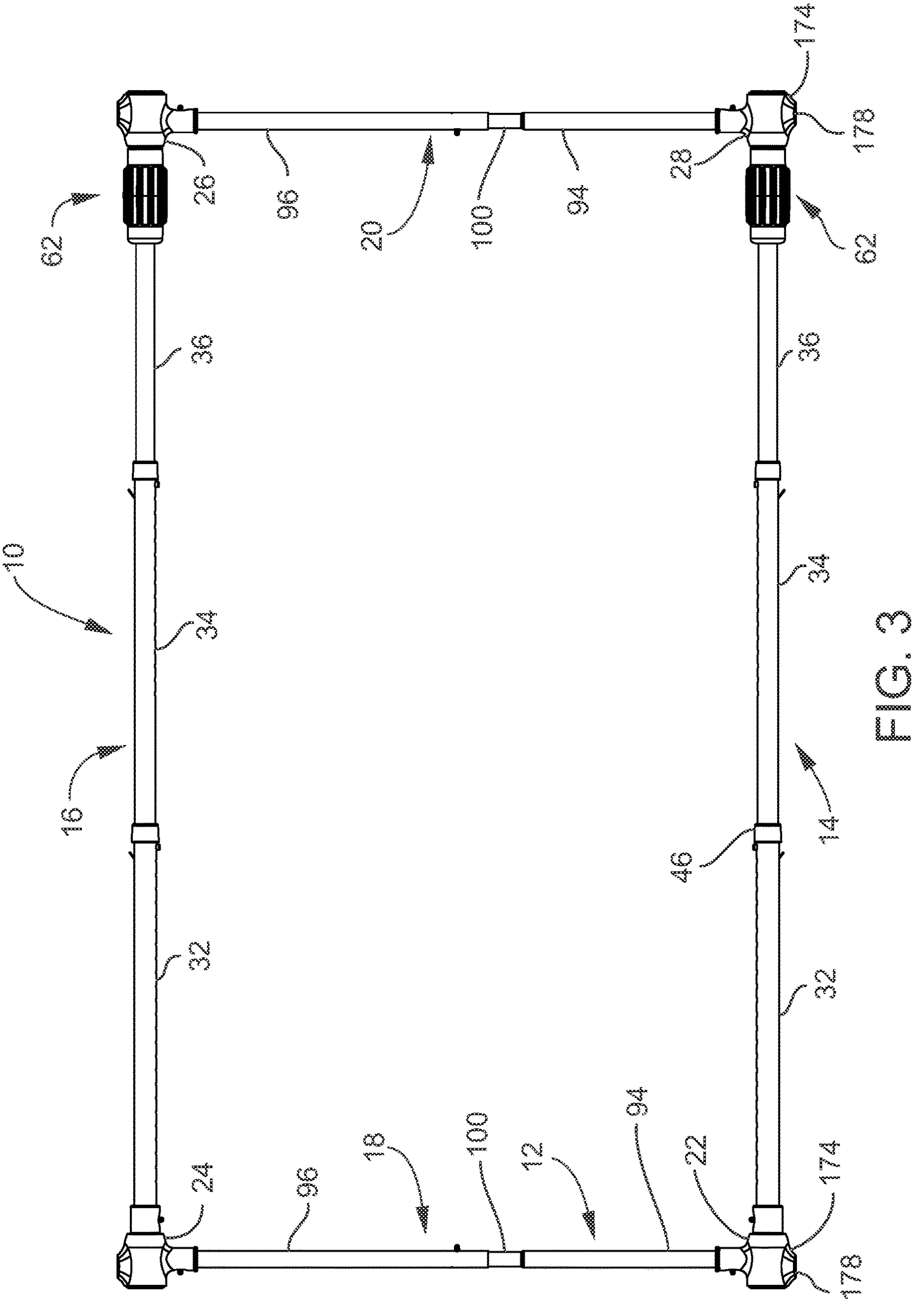
FIG. 3 is an elevation assembled view of the frame of the soft gate of FIG. 1.

Each of the junctions 22, 24, 26, 28 has a foot 174, as shown in FIG. 3. Foot 174 is operational for bottom most junctions 22, 28 and may, if desired, engage a floor, such as a floor between two door jambs. Each of the junctions 22, 24, 26, 28 include a cylindrical main body 176. Receivers 75, 152, and 154 extend from this main body 176. Foot 174 has a lowermost portion 178 that depends to a point lower than any other portion on the frame 12 or sheeting 30 when first longitudinal member 14 is parallel and adjacent to a floor. Foot 174 is a protrusion from the main body 176. Foot 174 on junctions 22, 28 has an endless sidewall 180 that tapers inwardly and downwardly.

Figure 2:
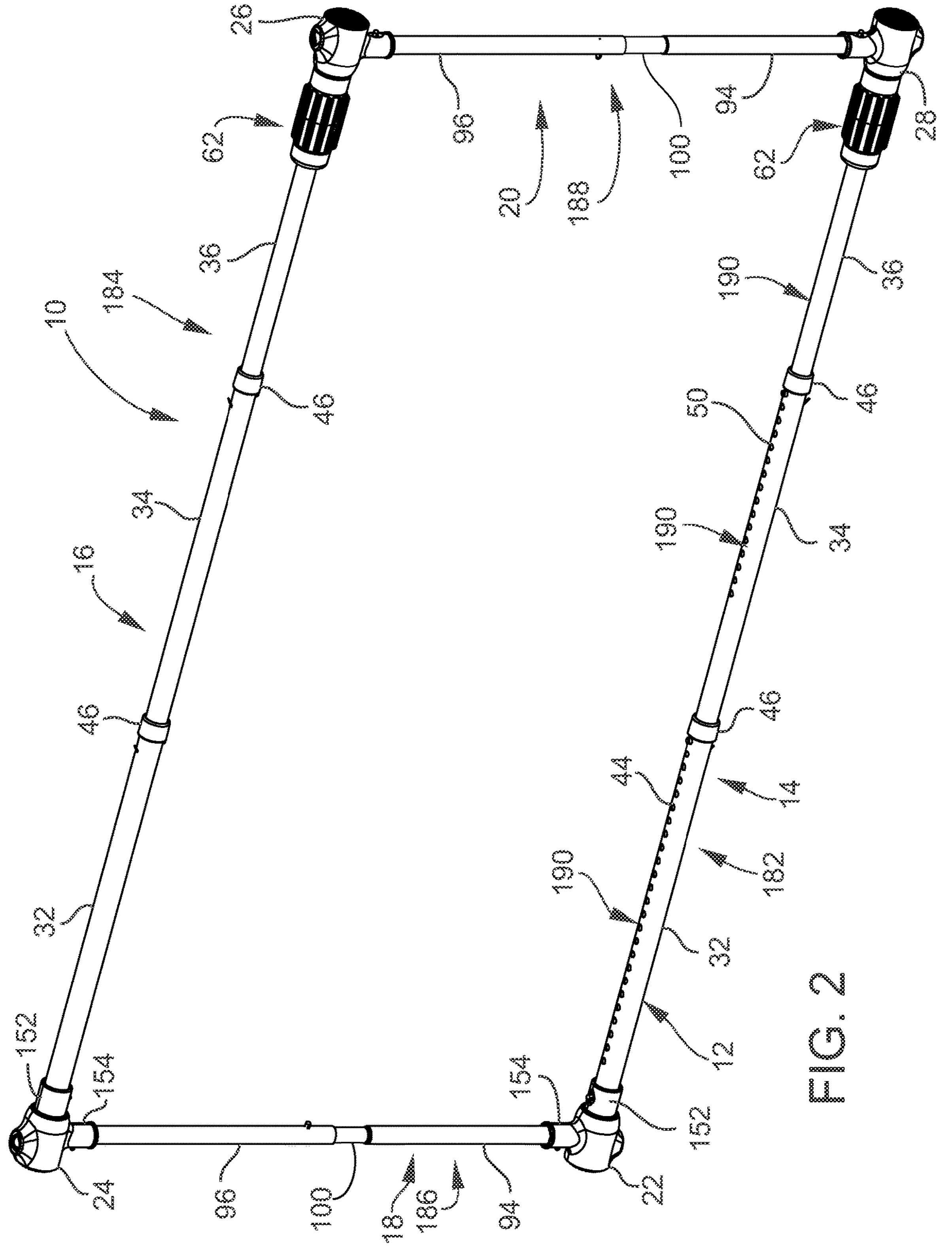
FIG. 2 is a perspective assembled view of the frame of the soft gate of FIG. 1.

In operation, with reference to FIGS. 1, 2, and 3, frame 12 is assembled by, for example, employing the following steps:

1) to assemble each of longitudinal support members 14, 16 where third support arms 36 and their respective junctions 26, 28, and second adjustment mechanism 62 is pre-assembled: a) slide the free end of third support member portion 36 into second support member portion 34; b) then slide the free end of second support member portion 34 into first support member portion 32, and c) then snap the free end of the first support members 32 into their respective receivers 152 of respective junctions 22, 24 using button lock 38 of the free end of first support member 32 so as to form junction-longitudinal support member-second adjustment mechanism-junction units 182, 184, where such units are identical;
2) to assemble each of the lateral support members 18, 20: slide the male sections 100 of respective first lateral support members 94 into respective second lateral support members 96 until the button locks 38 engage respective openings 116 of respective second lateral support members 96 so as to form units 184, 186, which are identical to each other and which are lateral support members 18, 20;
3) to assemble units 182, 184, 186, 188: a) slide the free end of first lateral support members 94 having button locks 38 into receivers 154 of respective junctions 22, 28 until the button locks 38 engage the respective junctions 22, 28; b) slide the free end of second lateral support members 96 having button locks 38 into receivers 154 of respective junctions 24, 26 until the button locks 38 engage the respective junctions 24, 26 so as to form the assembled frame 12 shown in FIGS. 2 and 3.

There may be a number of embodiments for sheeting. Thus, frame 12 may be assembled first, after which sheeting may be engaged on the frame 12 where such sheeting includes snaps, Velcro® straps, zippers, and other closure apparatus for opening and closing portions of the sheeting relative to other portions of the sheeting. Sheeting 30 includes no such closure apparatus.

In operation, sheeting 30 is engaged with frame 12 as shown in FIGS. 5A, 5B, 5C, and 5D:

1) unit 184 (junction 24-longitudinal support member 16-second adjustment mechanism 62-junction 26) is slid into sleeve 122;
2) unit 186 (lateral support member 18) is slid into sleeve 124 and the free end of second lateral support member portion 96 having button lock 38 is engaged with junction 24, with unit 186 fully retracted such that stop 102 is engaged by the second lateral support member portion 96;
3) unit 188 (lateral support member 20) is slid into sleeve 126 and the free end of second lateral support member portion 96 having button lock 38 is engaged with junction 26, with unit 188 fully retracted such that stop 102 is engaged by the second lateral support member portion 96;
4) unit 182 (junction 22-longitudinal support member-second adjustment mechanism 62-junction 28) is slid into sleeve 120;
5) the free end of first lateral support member portion 94 of unit 186 (lateral support member 18) having button lock 38 is engaged with junction 22;
6) the free end of first lateral support member portion 94 of unit 188 (lateral support member 20) having button lock 38 is engaged with junction 28; and
7) each of units 186, 188 (lateral support members 18, 20) are extended so as to engage the button locks 38 of the male sections 100 of first lateral support member portions 94 with openings 116 of second lateral support member portions 96, which extensions draw sheeting 30 from a relaxed form to a taut or tightened form.

In operation, to engage the soft sheeted barrier 10 to and between two vertical surfaces, such as between door jambs, one or more of the second longitudinal adjustment mechanism 62 and the first longitudinal adjustment mechanism 190 may be operated. First longitudinal adjustment mechanism 190 is one or more of first longitudinal support member portion 32 and its openings 44, second longitudinal support member portion 34, the openings 50 of second longitudinal support member portion 34, button lock 38 of second longitudinal support member portion 34 that engages openings 44, and third longitudinal support member portion 36 and its button lock 38 that engages openings 50. For example, the following method may be employed:

1) the frame 12 may be retracted longitudinally first by the first longitudinal adjustment mechanisms 190;
2) then the soft sheeted longitudinally retracted barrier 10 is placed between two door jambs;
3) then the soft sheeted longitudinally retracted barrier 10 is extended by employing the first longitudinal adjustment mechanisms 190 until the bumpers 164 of all four junctions 22, 24, 26, 28 are adjacent to and as close as possible to the door jambs;
4) then the second adjustment mechanisms 62 are operated by rotating the hand wheel 66 until the annular pushing end 88 or hand wheel pusher 88 makes contact with the annular receiving portion 192 of junctions 26, 28, whereupon rotation of the hand wheel 66 may continue so as to push junctions 26, 28 and their respective bumpers 164 relatively axially away from junctions 22, 24 and their respective bumpers 164, whereupon frame 12 is extended longitudinally while maintaining the ends of third support member portion 36 and externally threaded piece 64 in receiver 75 by virtue of slots 58, 72 traveling and sliding relative to pin 60 engaged in such slots 58, 72, and whereupon at some point bumpers 164 engage their respective door jambs and relatively push back against the frame 12 so as to fix soft sheeted barrier 10 with tension off the floor between the door jambs.

In operation, when the soft sheeted barrier 10 is fixed to and between the two vertical surfaces, such as the two door jambs, the soft sheeted barrier 10 may prevent children and pets from gaining access to the other side of the soft sheeted barrier 10. Since the mesh 148 is see-through, the caretaker can see the child, children, pet or pets on the other side of the soft sheeted barrier 10.

In operation, to take down the soft sheeted barrier 10, the hand wheel 66 is operated in the reverse direction as set-up so as to slowly decrease tension in the frame 12 such that frame 12 may remain upright between the door jambs without crashing immediately to the floor, whereupon at some point the soft sheeted barrier 10 may be lifted away from between the door jambs.

Figure 11A:
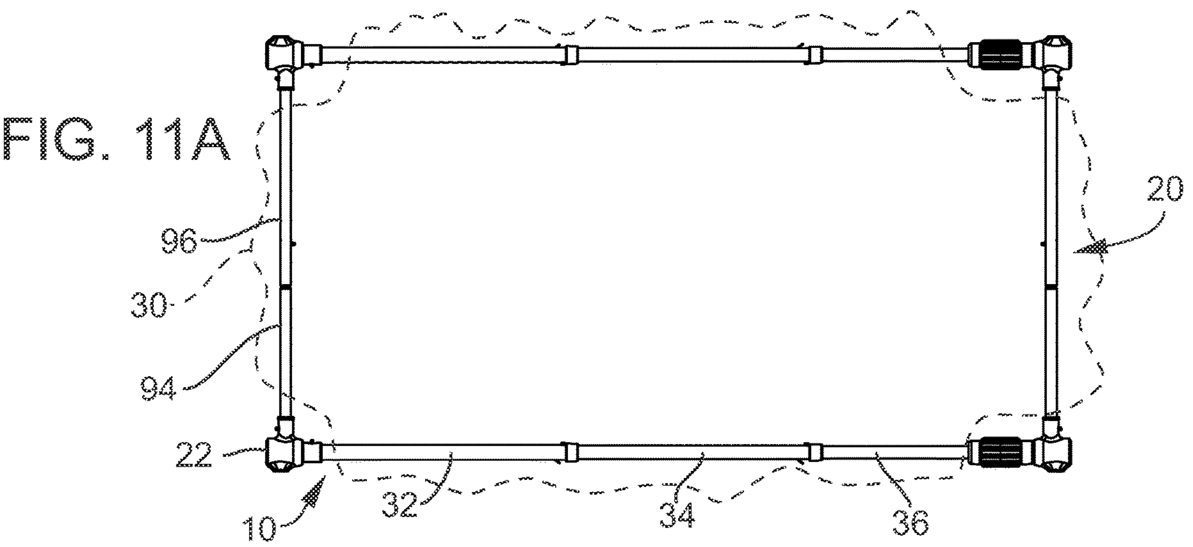
FIG. 11A is an elevation view of the frame of FIG. 1 having been extended longitudinally to a maximum extent and laterally to a fixed location, and shows the sheeting in a relaxed state.
Figure 11B:
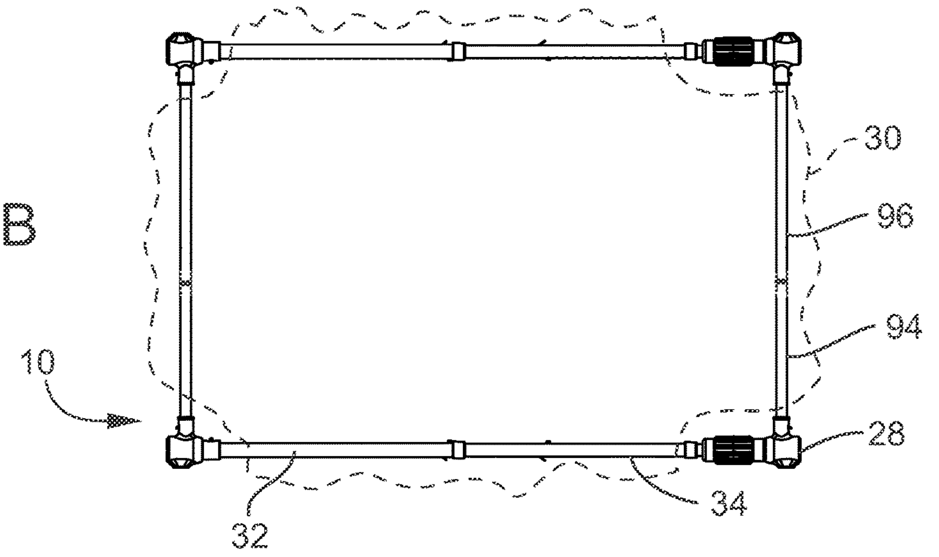
FIG. 11B is an elevation view of the frame of FIG. 11A having been retracted longitudinally relative to FIG. 11A to an intermediate state but maintaining the fixed location laterally of FIG. 11A while the sheeting stays in the relaxed state.

In operation, the soft barrier 10 may be stored with or without sheeting 30. Where the sheeting includes snaps, Velcro® straps, zippers, and other closure apparatus for opening and closing portions of the sheeting relative to other portions of the sheeting, FIGS. 8A, 8B, 8C, 9A, 9B, and 9C shows operation of the first adjustment mechanism 190 so as to longitudinally retract the frame 12 employing the first, second, and third longitudinal support member portions 32, 34, 36 and the button locks 38 engaging openings 44, 50. Where sheeting 30 having no such closure apparatus is employed, frame 12 may be longitudinally retracted where the lateral support members 18 and 20 have been fully retracted and the sheeting 30 is relaxed, as shown in FIGS. 11A, 11B, and 11C, or where the lateral support members 18, 20 are in the fixed position where the button lock 38 of male section 100 of first lateral support member portion 94 engages opening 116 of second lateral support member portion 96 and the sheeting 30 is in the taut or tightened state.

Figure 10A:
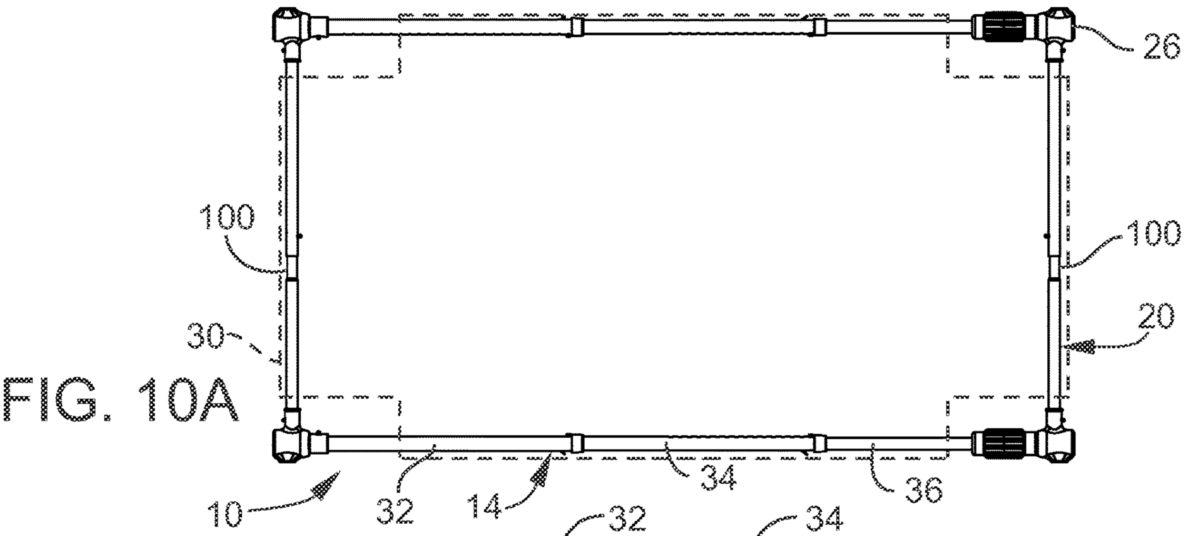
FIG. 10A is an elevation view of the frame of FIG. 1 having been extended longitudinally to a maximum extent and laterally to a fixed location, and shows the sheeting in a taut state.
Figure 10B:
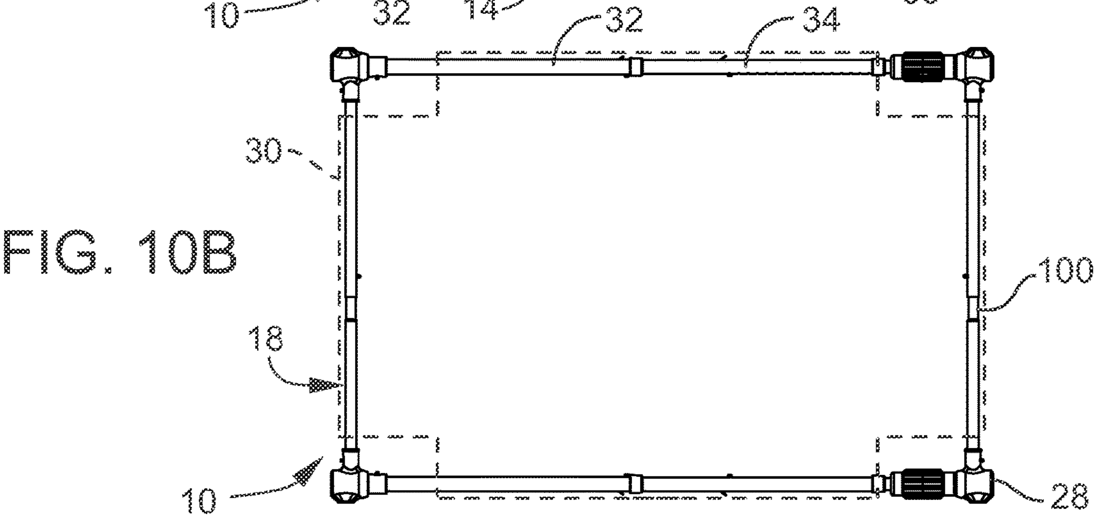
FIG. 10B is an elevation view of the frame of FIG. 10A having been retracted longitudinally relative to FIG. 10A to an intermediate state but maintaining the fixed location laterally of FIG. 10A and keeping the sheeting in the taut state.
Figure 10C:
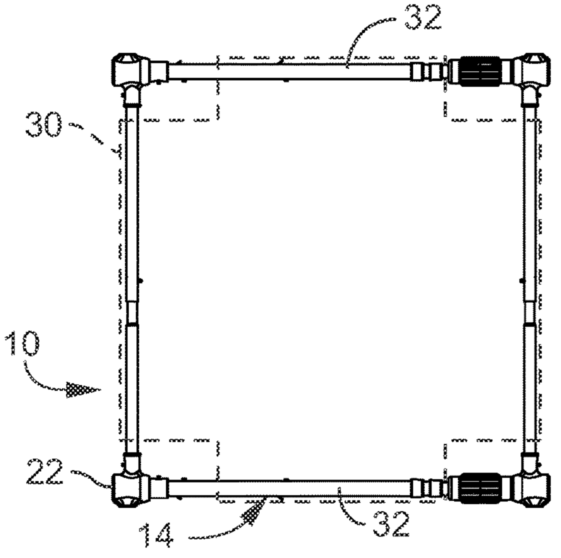
FIG. 10C is an elevation view of the frame of FIG. 10B having been retracted fully longitudinally to a maximum extent but maintaining the fixed location laterally of FIG. 10A and keeping the sheeting in the taut state.
Figure 11C:
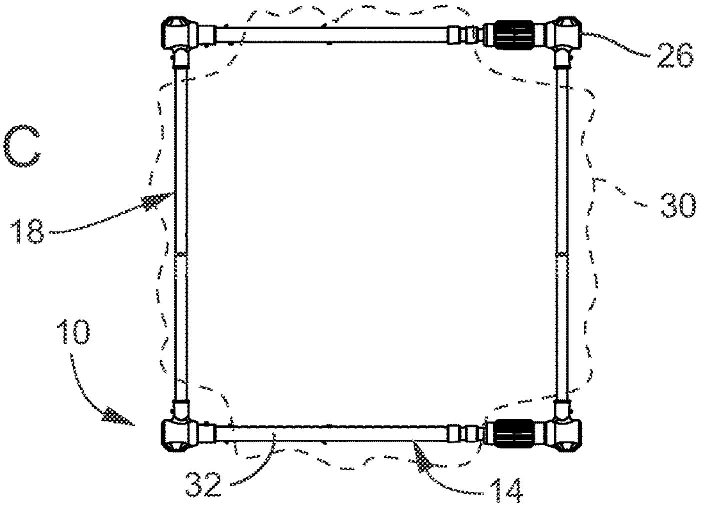
FIG. 11C is an elevation view of the frame of FIG. 11B having been retracted fully longitudinally to a maximum extent but maintaining the fixed location laterally of FIG. 11A while the sheeting stays in the relaxed state.

In operation, to store the soft barrier 10 in even a smaller state than shown in FIGS. 10C and 11C, one or more of the following steps may be employed:

1) units 186 and 188 are placed in their fully retracted state to place the sheeting 30 in the relaxed state;
2) units 182, 184, 186, and 188 are disengaged from each other;
3) units 182, 184, 186, 188 are taken out of the sheeting 30;
4) sheeting 30 is rolled up;
5) junctions 22 and 24 may be snapped off their respective first longitudinal support member portions 32;
6) first longitudinal support member portion 32 is fully slid into second longitudinal support member portion 34;
7) second longitudinal support member portion 34 is fully slid into third longitudinal support member portion 36; and
8) each of lateral support members 18, 20 are broken down into the first and second lateral support member portions 94, 96 by disengaging the button lock 38 of male section 100.

Then sheeting 30 and units 182, 184, 186, and 188 and/or their component parts may be placed in an elongate bag for storage or travel purposes.

Openings 44, 50 define predefined locations. The distance between adjacent openings 44 or the distance between adjacent openings 50 may be about equal to the length of one or more of slots 58, 72. The length of one or more of slots 58, 72 may be greater than the distance between two adjacent openings 40 or two adjacent openings 50. The length of one or more slots 58, 72 may be about 5% to about 10% greater than the distance between two adjacent openings 40 or openings 50, or the length of one or more slots 58, 72 may be about 5% to about 25% greater than the distance between two adjacent openings 40 or openings 50, or the length of one or more slots 58, 72 may be about 5% to about 50% greater than the distance between two adjacent openings 40 or openings 50, or the length of one or more slots 58, 72 may be about 5% to about 100% greater than the distance between two adjacent openings 40 or openings 50, or the length of one or more slots 58, 72 may be about 5% to about 200% greater than the distance between two adjacent openings 40 or openings 50.

Soft barrier 10 includes no gate or no door. However, if desired, a U-shaped or C-shaped openable flap may be formed in sheeting 30 and openable and sealed shut with a zipper or macroscopic hooks and loops such as Velcro®, where the size of such flap or flap opening is about the size of a cat or small dog. The flap may be adjacent to the lower longitudinal support member 14 and/or adjacent to one of junctions 22, 28. The flap may be adjacent to the lower longitudinal support member 14 and/or intermediate the junctions 22, 28 such as disposed centrally between the junctions 22, 28. The U-shape may be an inverted U-shape. The flap may be a right side up U-shape. The flap may take a rectangular form having adjacent sides of the same or different lengths, with the closure apparatus disposed on three of the sides and not disposed on the bottom most side. The flap may take a rectangular form having adjacent sides of the same or different lengths, with the quick connect mechanical or fabric closure apparatus disposed on three of the sides and not disposed on the right side or left side or top side or bottom side. Three of such sides of such rectangular form, by definition, describe a U-shape or a C-shape.

Soft barrier 10 defines a plane. Sheeting 30 in the taut state defines a plane. Frame 12 defines a plane. The two longitudinal support members 14, 16 define a plane. The two lateral support members 18, 20 define a plane.

The longitudinal support members 14, 16 are free of any direct connection to any lateral support members. The lateral support members 18, 20 are free from any direct connection to any longitudinal support members.

Figure 28:
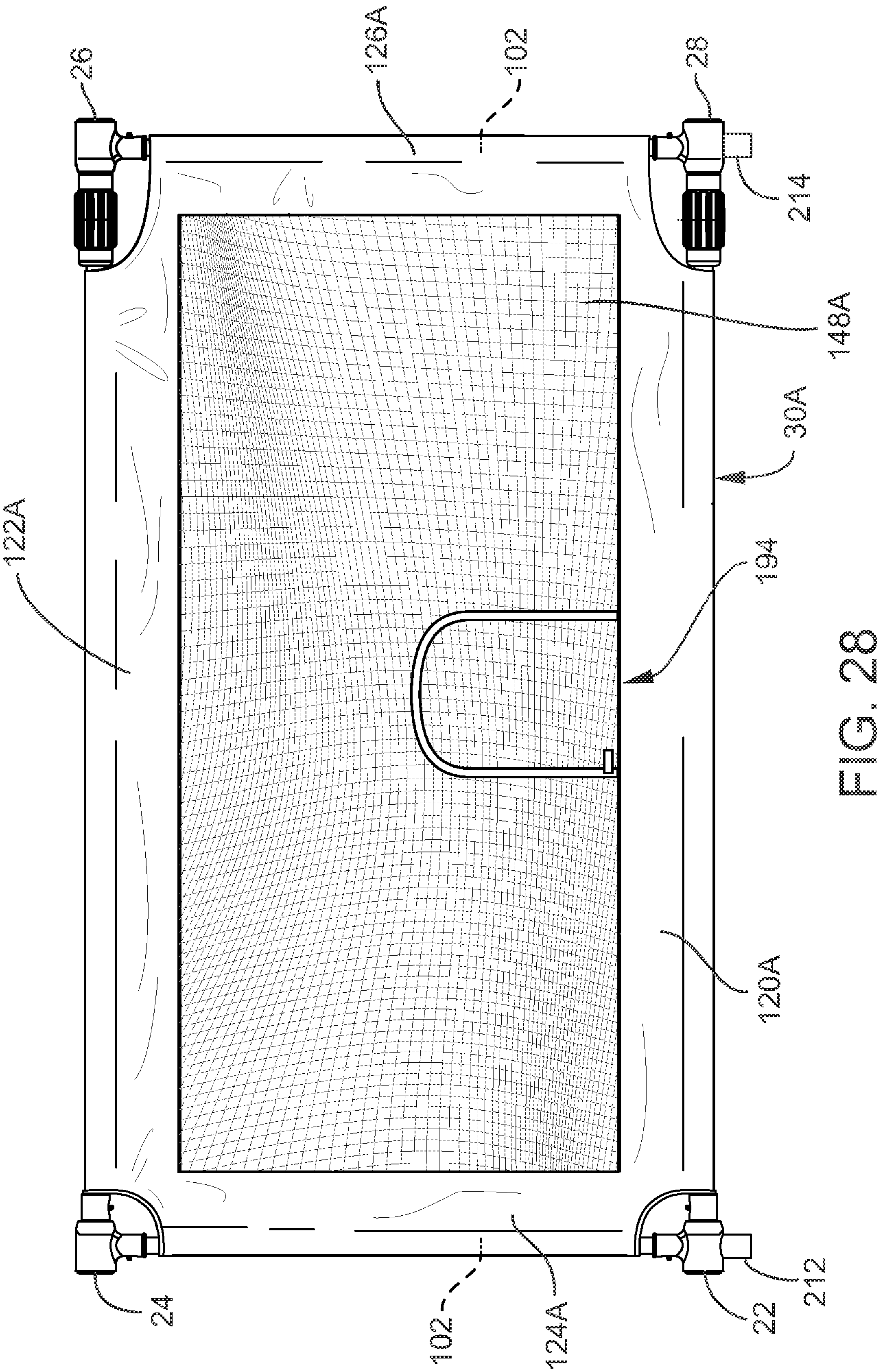
FIG. 28 is a side elevation view of a slightly different embodiment of the soft gate of FIG. 4, where the soft gate of FIG. 28 is shown with the longitudinal support members drawn in toward each other by the lateral support members such that the flexible fabric of the soft gate is relaxed.

FIG. 28 is a side elevation view of a slightly different embodiment of the soft gate 10 of FIG. 4, where the soft gate 10 of FIG. 28 is shown with the longitudinal support members 14, 16 drawn in toward each other by the lateral support members 18, 20 such that the flexible fabric 30A of the soft gate 10 is relaxed. In FIG. 28, the length of the lateral support members 18, 20 is minimized such that members 14, 16, 18, 20 and junctions 22, 24, 26, and 28 can be engaged easily. In FIG. 28, sheeting 30A is identical to sheeting 30 except that sheeting 30A has rounded junction openings adjacent to junctions 22, 24, 26, and 28 and except that sheeting 30A has sleeves 120A, 122A, 124A, and 126A that extend directly to mesh portion 148A such that longitudinal intermediate sheeting portion 146 and lateral intermediate sheeting portion 147 are eliminated.

Figure 29:
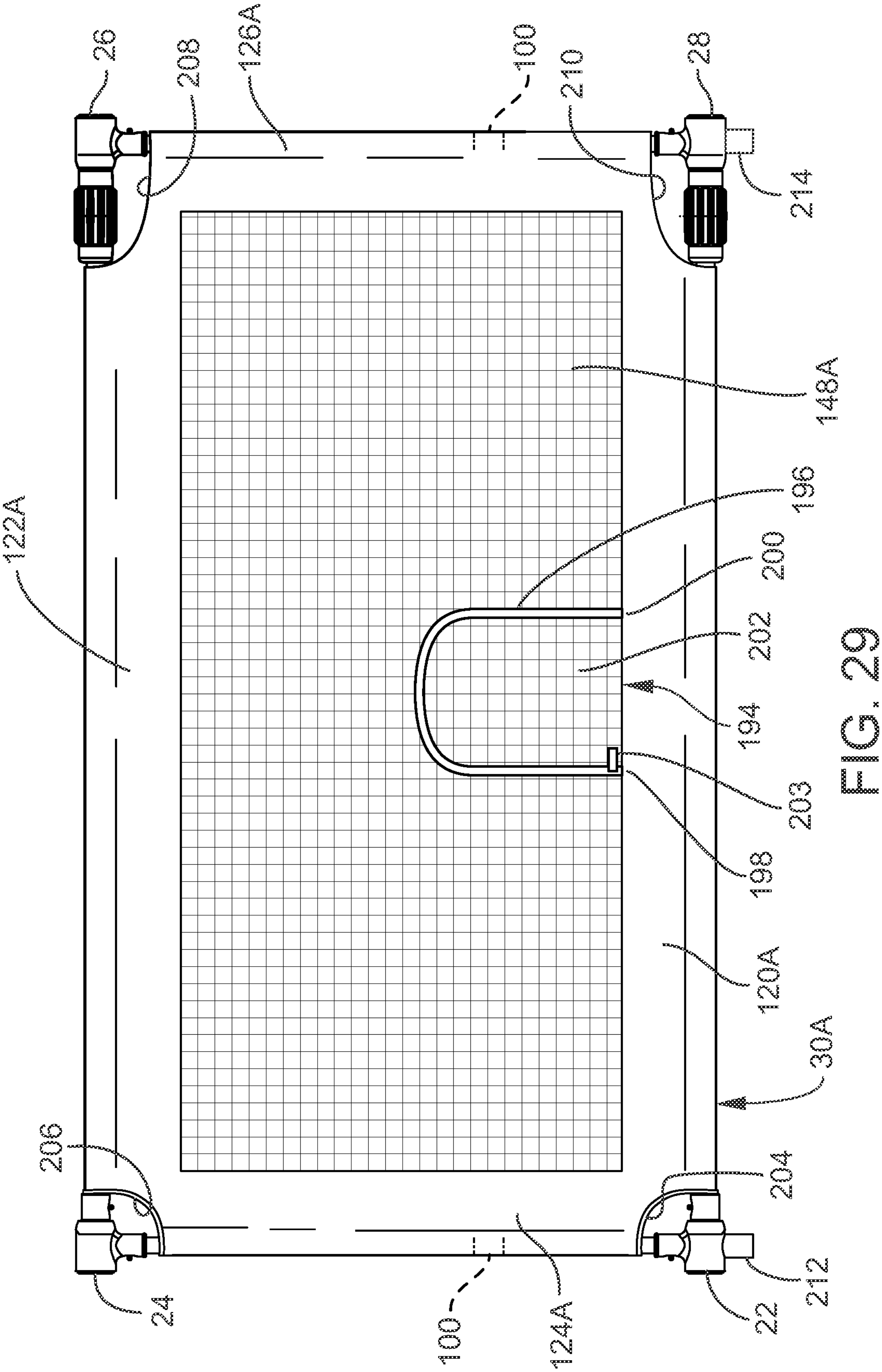
FIG. 29 is a side elevation view of the soft gate of FIG. 28 where the longitudinal support members are drawn apart from each other by the lateral support members such that the flexible fabric of the soft gate is drawn taut.

FIG. 29 is a side elevation view of the soft gate 10 of FIG. 28 where the longitudinal support members 14, 16 are drawn apart from each other by the lateral support members 18, 20 such that the flexible fabric 148A of the soft gate 10 is drawn taut. FIG. 29 further shows a pet door 194 having an inverted U-shape such that zipper teeth 196 have an inverted U-shape and such that a flap 202 has an inverted U-shaped. Zipper finger handle 203 pulls the zipper opener and closer along the zipper teeth 196 from location 198 to location 200 such that flap 202 can lay open by gravity on either of the faces of the soft barrier 10. Zipper finger handle 203 is disposed on each of the sides or faces of the soft barrier 10 such that two zipper finger handles 203 are provided such that a caretaker need not climb over the barrier 10 or reach over the barrier 10 to open or close the pet door 194 and such that a zipper finger handle 203 is provided on the side that the caretaker is on at the present time. The bottom of flap 202 is engaged, such as by stitching, to longitudinal sleeve 120A. Flap 202 is formed of mesh. If desired, flap 202 may be formed of a non-mesh material such as nylon or another fabric or another flexible material. FIG. 29 shows that the rounded junction openings adjacent to junctions 22, 24, 26, and 28 that are mentioned with respect to FIG. 28 above are formed by rounded edges 204, 206, 208, and 210 of sheeting 30A.

Figure 30:
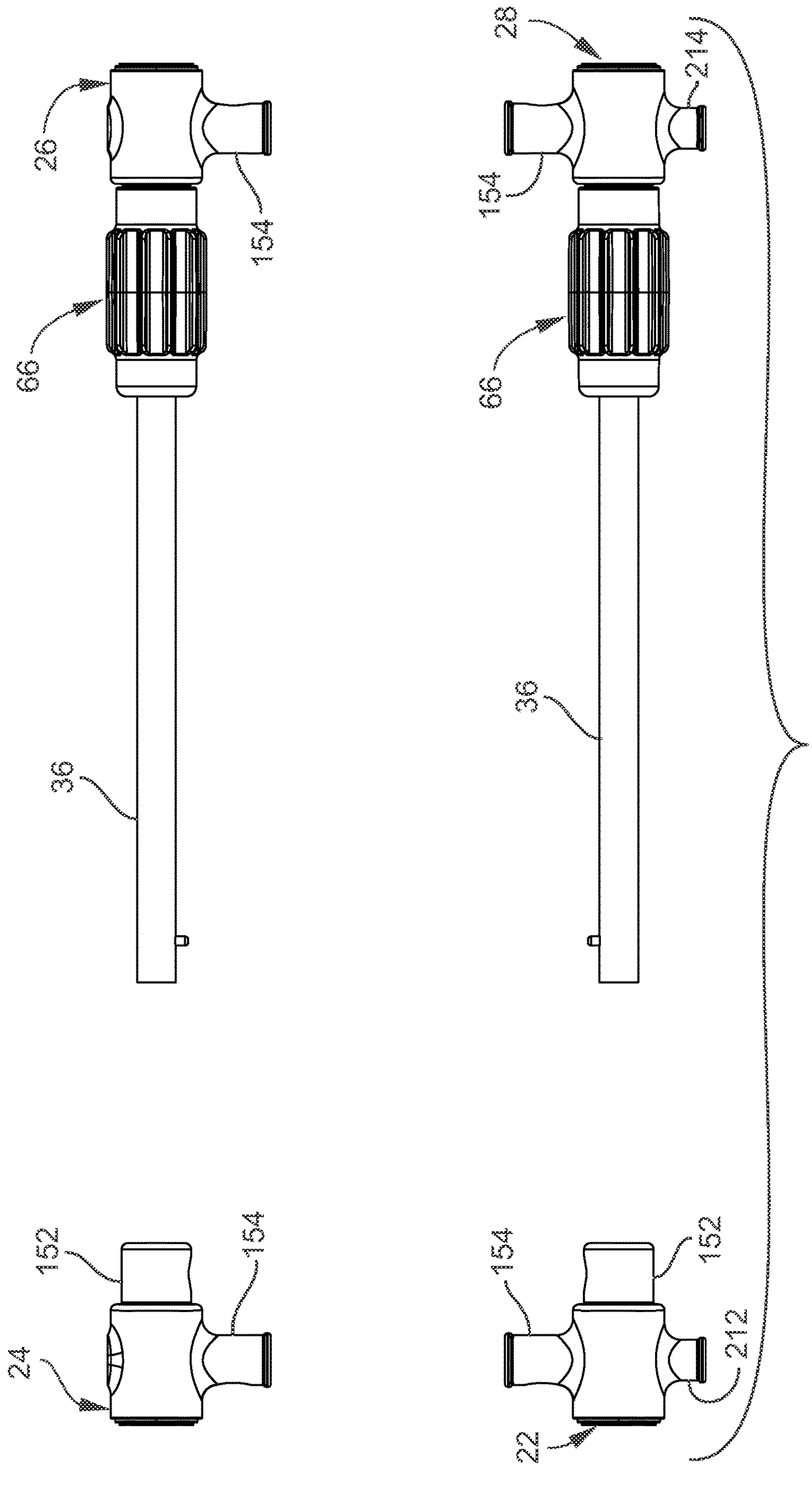
FIG. 30 is an isolated view of the four corner junctions of the soft gate of FIGS. 28 and 29.

FIG. 30 is an isolated view of the four corner junctions 22, 24, 26, 28 where the lower junctions 22, 28 include feet 212, 214 instead of feet 174. Feet 212, 214 are integral and one-piece with its respective junction 22, 28. Each of the feet 212, 214 is tubular so as to have a cylindrical depression or cylindrical open distal end. A rubber or rubber like insert may be placed into such distal end or a rubber or rubber like cap may be engaged over the distal end of feet 212, 214 so as to protect against scratching on a floor surface. Molding or trim or molding or trim strips may be engaged at the junction of a floor and a wall and extend up the wall. Feet 212, 214 provide height to the lower junctions 22, 28 such that lower junctions 22, 28 engage the wall above such molding, trim, molding strip, or trim strip and such that soft barrier 10 may have six points of engagement to a passageway, where two of the points of engagement are relative to the floor and provided by feet 212, 214 and where four points of engagement are relative to the opposing walls and provided by disk shaped bumpers 164 on the outer ends of each of junctions 22, 24, 26, 28.

Figure 9A:
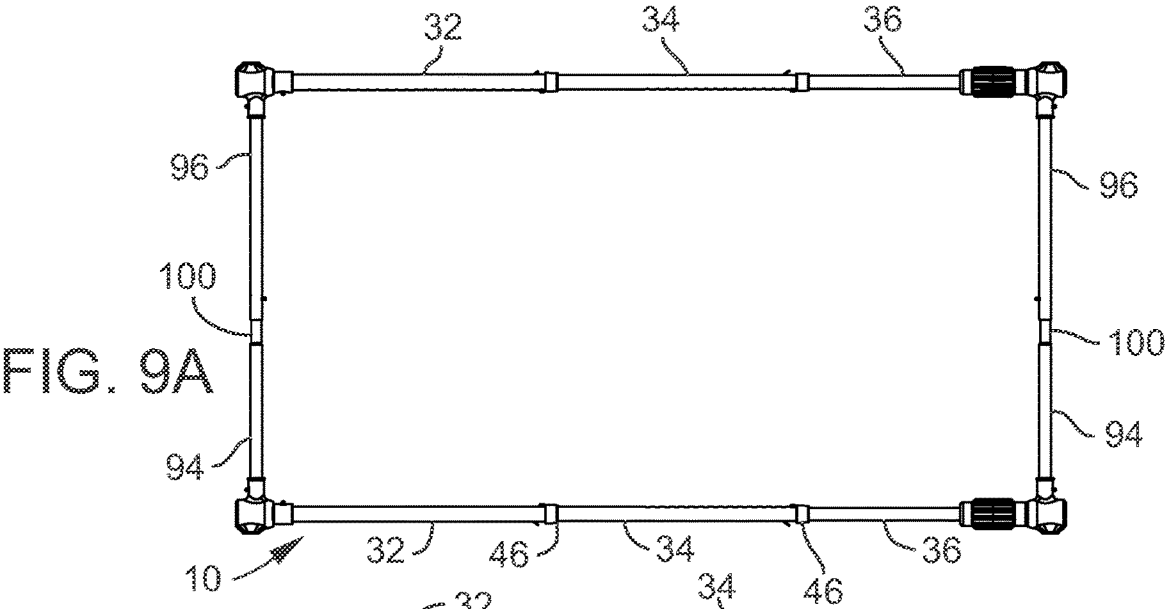
FIG. 9A is an elevation view of the frame of FIG. 1 having been extended longitudinally to a maximum extent and laterally to a fixed location.
Figure 9B:
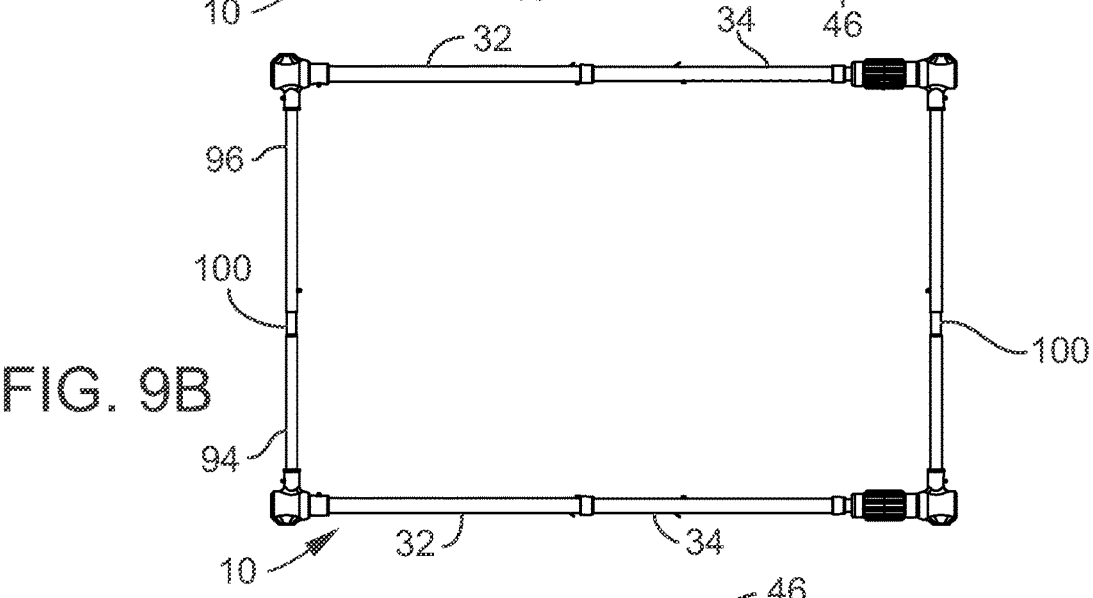
FIG. 9B is an elevation view of the frame of FIG. 9A having been retracted longitudinally relative to FIG. 9A to an intermediate state but maintaining the fixed location laterally of FIG. 9A.
Figure 9C:
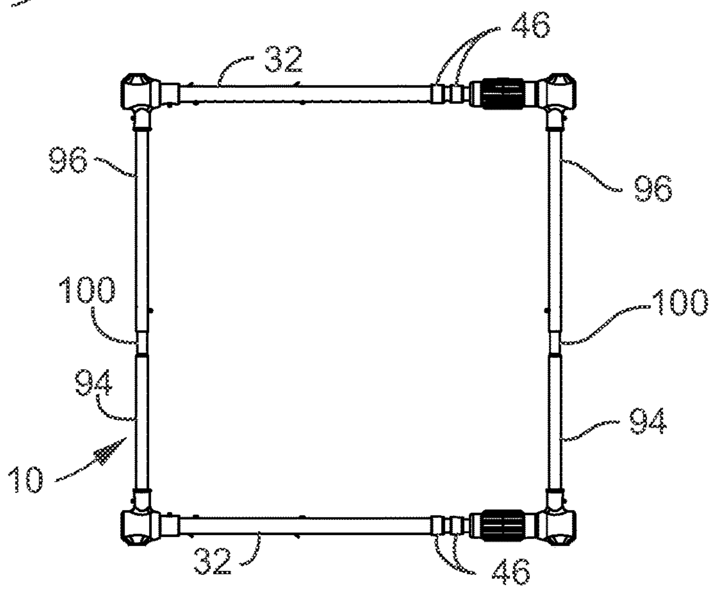
FIG. 9C is an elevation view of the frame of FIG. 9B having been retracted fully longitudinally to a maximum extent but maintaining the fixed location laterally of FIG. 9A.

To minimize the length of the combination of support member portions 32, 34, and 36, as shown in FIGS. 9C and 10C, it is preferred that the first step is to engage support member portions 32 and 34 such that button 42 on support member portion 34 engages the button opening 44 on support member 32 that is the closest to junction 22. The second step is to engage support member portion 36 with support member portion 34 such that button 42 on support member portion 36 engages the button opening 44 on support member portion 34 that is closest to junction 22, which button 42 on support member portion 36 preferably also engages a button opening 44 on the support member portion 32 since, after support member portion 34 is slid into support member portion 32, buttons of the portions 32, 34 align with each other, i.e., share common vertical axis. It should be noted that, alternatively, where support member portions 34, and 36 are first engaged and then such combination is engaged with support member portion 32, one presses two buttons at generally the same time to engage the support member combination 34, 36 with support member portion 32, where such two buttons are made up of one button on support member portion 36 and another button on support member portion 34.

Soft barrier 10 includes a lower first longitudinal adjustment mechanism 190 and an upper first longitudinal adjustment mechanism 190. Such upper and lower first longitudinal adjustment mechanism 190 are structurally and functionally independent of each other.

Soft barrier 10 includes a lower second longitudinal adjustment mechanism 62 and an upper second longitudinal adjustment mechanism 62. Such upper and lower second longitudinal adjustment mechanisms 62 are structurally and functionally independent of each other. In other words, when setting up the soft barrier 10, it often happens that walls are not perfectly flat or disposed in a plane or that opposing walls are not perfectly parallel to each other. With the upper and lower second adjustment mechanisms 62 being independent of each other, each of the mechanisms 62 may be operated independently such that disk shaped bumper 164 of junction 26 may not be disposed in a plane with, but rather offset from, disk shaped bumper 164 of junction 28 when both bumpers 164 are in their final resting places upon a wall. Likewise, each of the mechanisms 62 may be operated independently such that disk shaped bumper 164 of junction 24 may not be disposed in a plane with, but rather offset from, disk shaped bumper 164 of junction 22 when such bumpers 164 are in their final resting places upon a wall. Each of lower and upper second longitudinal adjustment mechanisms 62 includes a hand wheel 66 that may be referred to as a handle such that mechanisms 62 may be referred to as handles 62 or handle adjustments 62.

Prior to engaging the longitudinal support members 14, 16 and lateral support members 18, 20 with the sheeting 30 or 30A, longitudinal support members 14, 16 may be isolated and set up alone, without sheeting 30 or 30A in a passageway utilizing first longitudinal adjustment mechanism 190 so as to set each of the longitudinal support members 14, 16 to a length that is substantially equal to the length or width across the passageway at the different heights of the longitudinal support members 14, 16. In this isolated preliminary measuring step, the second longitudinal adjustment mechanism 62 is unengaged such that junctions 26, 28 can slide back and forth relative to the remaining portion of the second longitudinal adjustment mechanism 62, with the final adjustment of the first longitudinal adjustment mechanism being taken when the junctions 26, 28 have been fully slid inwardly. Otherwise, if the final adjustment of the first longitudinal adjustment mechanism is being taken when the junctions 26, 28 are fully slid out, then the hand wheel 66 would not push the junctions 26, 28 further outwardly such that no further tightening would take place. After such final adjustment, then longitudinal support members 14, 16 and lateral support members 18, 20 are engaged with sheeting 30 or 30A. Then, after members 14, 16, 18, and 20 are engaged with junctions 22, 24, 26, and 28, and after the lateral support members 18, 20 are expanded to draw taut the sheeting 30 or 30A, soft barrier 10 may be lifted into the passageway at the location first measured or ascertained by the isolated longitudinal support members 14, 16 such that, at this point in the set up process, it is no longer necessary to operate the upper and lower first longitudinal adjustment mechanisms 190. Instead, only the second longitudinal adjustment mechanisms 62 are operated so as to fine tune the fitting and draw the fitting tight by rotation of the hand wheels 66 of the second longitudinal adjustment mechanism 62 so as to increase the effective length of longitudinal support members 14, 16 by pushing the junctions 26, 28 outwardly relative to the remaining portion of second adjustment mechanism 62 so as to pinch soft barrier 10 between opposing walls of the passageway. If rotation of hand wheels 66 does not fix the soft barrier 10 tightly in the passageway, one or more of the first longitudinal adjustment mechanisms 190 may be operated by depressing one or more buttons 42 and drawing one or more support member portions 32, 34, 36 apart. Such buttons 42 may be depressed by pushing on the flexible sheeting 30 or 30A that is disposed over such button or buttons 42.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A soft barrier comprising:

a) a frame having first and second longitudinal support members, first and second lateral support members, and first, second, third, and fourth junctions, the first junction being between the first longitudinal support member and the first lateral support member, the second junction being between the first lateral support member and the second longitudinal support member, the third junction being between the second longitudinal support member and the second lateral support member, and the fourth junction being between the second lateral support member and the first longitudinal support member;

b) flexible sheeting engaged between the first and second longitudinal support members and between the first and second lateral support member;

c) the first junction being engaged to the first longitudinal support member and the first lateral support member, the second junction being engaged to the first lateral support member and the second longitudinal support member, the third junction being engaged to the second longitudinal support member and the second lateral support member, and the fourth junction being engaged to the second lateral support member and the first longitudinal support member;

d) the frame having a longitudinally fully extended state where a distance between the first and second lateral support members is maximized;

e) the frame having a longitudinally fully retracted state where the distance between the first and second lateral support members is minimized;

f) the frame being longitudinally extendable from the longitudinally fully retracted state to the longitudinally fully extended state, the frame being longitudinally retractable from the longitudinally fully extended state to the longitudinally fully retracted state;

g) the frame having a laterally fully retracted state where a first distance between the first and second longitudinal support members is minimized;

h) the frame having a laterally fixed extended state where a second distance between the first and second longitudinal support members is fixed;

i) the frame being laterally extendable from the laterally fully retracted state to the laterally fixed extended state, the frame being laterally retractable from the laterally fixed extended state to the laterally fully retracted state;

j) the first longitudinal support member including sections that telescope relative to each other, the second longitudinal support member including sections that telescope relative to each other, the first lateral support member including sections that telescope relative to each other, and the second lateral support member including sections that telescope relative to each other; and k) the first junction having a first female portion engaged to a first male portion of the first longitudinal support member, the first junction having a second female portion engaged to a first male portion of the first lateral support member, the first and second female portions of the first junction extending outwardly from a body of the first junction;

l) the second junction having a first female portion engaged to a second male portion of the first lateral support member, the second junction having a second female portion engaged to a first male portion of the second longitudinal support member, the first and second female portions of the second junction extending outwardly from a body of the second junction;

m) the third junction having a first female portion engaged to a second male portion of the second longitudinal support member, the third junction having a second female portion engaged to a first male portion of the second lateral support member, the first and second female portions of the third junction extending outwardly from a body of the third junction; and n) the fourth junction having a first female portion engaged to a second male portion of the second lateral support member, the fourth junction having a second female portion engaged to a second male portion of the first longitudinal support member, the first and second female portions of the fourth junction extending outwardly from a body of the fourth junction.

2. The soft barrier of claim 1, wherein each of the first and second longitudinal support members includes first and second adjustment mechanisms, the first adjustment mechanism of the first longitudinal support member fixing the lateral support members apart from each other at first and second predefined locations, the first adjustment mechanism of the second longitudinal support member fixing the lateral support members apart from each other at said first and second predefined locations, the second adjustment mechanism of the first longitudinal support member fixing the lateral support members apart from each other at a plurality of further locations, the second adjustment mechanism of the second longitudinal support member fixing the lateral support members apart from each other at said plurality of further locations, the plurality of further locations being between the first and second predefined locations.

3. The soft barrier of claim 1, wherein each of the first and second longitudinal support members includes first and second adjustment mechanisms, the first adjustment mechanism of the first longitudinal support member having a plurality of first locations spaced longitudinally from each other with the first longitudinal support member being lockable at each of said first locations, the first adjustment mechanism of the second longitudinal support member having a plurality of second locations spaced longitudinally from each other with the second longitudinal support member being lockable at each of said second locations, the second adjustment mechanism of the first longitudinal support member being operated after the first adjustment mechanism of the first longitudinal support member has been locked, the second adjustment mechanism of the second longitudinal support member being operated after the first adjustment mechanism of the second longitudinal support member has been locked.

4. The soft barrier of claim 1, wherein the flexible sheeting includes a relaxed state when the frame is in the laterally fully retracted state, and wherein the flexible sheeting includes a taut state when the frame is in the laterally fixed state.

5. The soft barrier of claim 1, wherein the first longitudinal support member includes first, second, and third support member portions, the first support member portion being engaged to the first junction, the third support member portion being engaged to the fourth junction, and the second support member portion being engaged to and between the first and third support member portions, the first support member portion having a plurality of first openings, the second support member portion having a depressible button lock engagable with each of the first openings of the first support member portion, the second support member portion having a plurality of second openings, the third support member portion having a depressible button lock engagable with each of the second openings of the second support member portion, the third support member portion being slidable into the second support member portion, the second support member portion being slidable into the first support member portion.

6. The soft barrier of claim 1, wherein the flexible sheeting bypasses each of the first, second, third, and fourth junctions to permit access to each of the first, second, third, and fourth junctions.

7. The soft barrier of claim 1, wherein the flexible sheeting includes first and second lateral sleeves for engaging the first and second lateral support members respectively, and wherein the flexible sheeting includes first and second longitudinal sleeves for engaging the first and second longitudinal support members respectively.

8. The soft barrier of claim 1, wherein the soft barrier includes no gate.

9. The soft barrier of claim 1, wherein the flexible sheeting includes a flexible door that is openable and closeable.

10. The soft barrier of claim 1, wherein the frame includes no gate.

11. The soft barrier of claim 1, wherein none of the longitudinal support members, lateral support members, first, second, third, and fourth junctions is engaged to a gate.

12. The soft barrier of claim 1, wherein the soft barrier defines a plane.

13. The soft barrier of claim 1:

a) wherein the longitudinal support members oppose each other with no support members, other than the first and second lateral support members, being engaged to and between the longitudinal support members; and b) wherein the lateral support members oppose each other with no support members, other than the first and second longitudinal support members, being engaged to and between the lateral support members.

* * * * *